(12) United States Patent
Yang et al.

(10) Patent No.: US 7,907,226 B2
(45) Date of Patent: Mar. 15, 2011

(54) METHOD OF FABRICATING AN ARRAY SUBSTRATE FOR LIQUID CRYSTAL DISPLAY DEVICE

(75) Inventors: Myoung-Su Yang, Gyeonggi-do (KR); Kum-Mi Oh, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 36 days.

(21) Appl. No.: 12/591,738

(22) Filed: Nov. 30, 2009

(65) Prior Publication Data

US 2010/0144074 A1    Jun. 10, 2010

Related U.S. Application Data

(62) Division of application No. 10/980,265, filed on Nov. 4, 2004, now Pat. No. 7,646,442.

(30) Foreign Application Priority Data

Nov. 11, 2003  (KR) .................. 10-2003-0079289

(51) Int. Cl.
*G02F 1/136*   (2006.01)
*H01L 21/00*   (2006.01)
*H01L 29/00*   (2006.01)

(52) U.S. Cl. ............... 349/43; 438/30; 438/149; 257/59

(58) Field of Classification Search ..................... 349/43
See application file for complete search history.

(56) References Cited

U.S. PATENT DOCUMENTS

| 6,166,794 | A * | 12/2000 | Sung ............................. 349/138 |
| 6,246,070 | B1 * | 6/2001 | Yamazaki et al. .............. 257/40 |
| 6,261,881 | B1 * | 7/2001 | Yamazaki et al. ............ 438/161 |
| 6,406,949 | B1 * | 6/2002 | Kim ................................ 438/159 |
| 6,674,106 | B2 * | 1/2004 | Tanaka et al. ................. 257/222 |
| 6,800,510 | B2 * | 10/2004 | Peng et al. .................... 438/149 |
| 2001/0052598 | A1 * | 12/2001 | Koga et al. ...................... 257/59 |

* cited by examiner

*Primary Examiner* — W. Patty Chen
(74) *Attorney, Agent, or Firm* — McKenna Long & Aldridge LLP

(57) ABSTRACT

A liquid crystal display device having a switching element in a pixel portion and a CMOS element in a driving portion includes: a substrate; a gate electrode on the substrate; a gate insulating layer on the gate electrode; a polycrystalline silicon layer on the gate insulating layer, the polycrystalline silicon layer having an active region in a central portion corresponding to the gate electrode and an ohmic contact region at side portions of the active region; an interlayer insulating layer having a set of contact holes for contacting the polycrystalline silicon layer at the side portions; and source and drain electrodes spaced apart from each other on the interlayer insulating layer, the source and drain electrodes contacting the polycrystalline silicon layer through the set of contact holes.

15 Claims, 28 Drawing Sheets

METHOD OF FABRICATING AN ARRAY SUBSTRATE FOR LIQUID CRYSTAL DISPLAY DEVICE

CROSS-REFERENCE TO RELATED APPLICATIONS

This application is a divisional application of U.S patent application Ser. No. 10/980,265, filed Nov. 4, 2004, now U.S. Pat. No. 7,646,442 which claims priority to Korean Patent Application No.: 10-2003-0079289, filed Nov. 11, 2003 all of which are incorporated by reference for all purposes as if fully set forth herein.

BACKGROUND OF THE INVENTION

1. Field of the Invention

The present invention relates to a liquid crystal display device, and more particularly, it relates to a liquid crystal display (LCD) device including a polycrystalline silicon thin film transistor (p-Si TFT) and a method of fabricating the same.

2. Discussion of the Related Art

Liquid crystal display (LCD) devices are being developed as the next generation of display devices because of their advantageous characteristics of light weight, thin profile, and low power consumption. In general, an LCD device is a non-emissive display device that displays images by making use of a refractive index difference through utilizing optical anisotropy properties of liquid crystal molecules interposed between an array substrate and a color filter substrate. When an electric field is applied to liquid crystal molecules, the liquid crystal molecules are realigned. As a result, light transmittance of the liquid crystal molecules is changed according to a new alignment direction of the realigned liquid crystal molecules.

Recently, active matrix liquid crystal display (AM LCD) devices having thin film transistors (TFTs) and pixel electrodes arranged in matrix has been widely researched because of their superior resolution and capability to smoothly display moving images. The TFTs using hydrogenated amorphous silicon (a-Si:H) may be fabricated under a relatively low temperature. In hydrogenated amorphous silicon, however, since atoms are randomly arranged, weak bonds and dangling bonds exist. Accordingly, when light is irradiated or an electric field is applied, the hydrogenated amorphous silicon has a quasi-static state and this quasi-static state may deteriorate the stability of the TFT. Furthermore, the TFT using hydrogenated amorphous silicon may not be used for a driving circuit because of its relatively low mobility within a range of about 0.1 $cm^2/V \cdot sec$ to about 1.0 $cm^2/V \cdot sec$.

To overcome these drawbacks of the TFT using hydrogenated amorphous silicon, a TFT using polycrystalline silicon (p-Si) has been suggested for an LCD device. Polycrystalline silicon has a mobility that is one or two hundred times higher than that of hydrogenated amorphous silicon and a faster response time than that of hydrogenated amorphous silicon. Moreover, polycrystalline silicon is more stable against light, heat and electric field than hydrogenated amorphous silicon. Accordingly, the TFT including polycrystalline silicon may be used for a driving circuit of an LCD device and fabricated on a single substrate having a pixel TFT.

FIG. 1 is a schematic plan view of an array substrate including a driving circuit using polycrystalline silicon according to the related art. In FIG. 1, a substrate 1 has a pixel portion 3 at its central portion and a driving portion 5 at a periphery of the pixel portion 3. The driving portion 5 includes a gate driving unit 5a and a data driving unit 5b. A plurality of gate lines 7 connected to the gate driving unit 5a and a plurality of data lines 9 connected to the data driving unit 5b are disposed in the pixel portion 3. The plurality of gate lines 7 cross the plurality of data lines 9 to define a pixel region "P" and a pixel electrode 10 is formed in the pixel region "P." A thin film transistor (TFT) "T" in the pixel region "P" is connected to the gate line 7, the data line 9 and the pixel electrode 10. In addition, the gate driving unit 5a and the data driving unit 5b are connected to external signal input terminals 12. The gate driving unit 5a and the data driving unit 5b generate control signals, a gate signal and a data signal using external signals from the external signal input terminals 12 and supply the generated signals to the pixel portion 3 through the gate line 7 and the data line 9. The gate driving unit 5a and the data driving unit 5b may include TFTs using a complementary metal-oxide-semiconductor (CMOS) logic for quicker treatment of signals. Generally, a CMOS logic is used for driving TFTs where a fast signal processing is required. A p-type TFT using holes as carriers and a n-type TFT using electrons as a carrier are used for the CMOS logic. The p-type TFT and the n-type TFT are complementarily controlled.

FIG. 2A is a schematic cross-sectional view showing a switching element of a pixel portion according to the related art and FIG. 2B is a schematic cross-sectional view showing CMOS switching elements of a driving portion according to the related art. In FIG. 2A, a buffer layer 25 of an inorganic insulating material, such as silicon nitride (SiNx) or silicon oxide ($SiO_2$), is formed on a substrate 20. A first semiconductor layer 30 is formed on the buffer layer 25 and a gate insulating layer 45 is formed on the semiconductor layer 30. In addition, a first gate electrode 50 is formed on the gate insulating layer 45 over the first semiconductor layer 30 and an interlayer insulating layer 70 is formed on the first gate electrode 50. The interlayer insulating layer 70 has a first set of contact holes 73a and 73b exposing the first semiconductor layer 30. First source and drain electrodes 80a and 80b are formed on the interlayer insulating layer 70. The first source and drain electrodes 80a and 80b are connected to the first semiconductor layer 70 through the first set of contact holes 73a and 73b. A passivation layer 90 is formed on the first source and drain electrodes 80a and 80b. The passivation layer 90 has a first drain contact hole 95 exposing the first drain electrode 80b. A pixel electrode 97 is formed on the passivation layer 90 and connected to the first drain electrode 80b through the first drain contact hole 80.

The first semiconductor layer 30 includes a first active region 30a corresponding to the first gate electrode 50, a first ohmic contact region 30c at both sides of the first active region 30a and a first lightly doped drain (LDD) region 30b interposed between the first active region 30a and the first ohmic contact region 30c. The first ohmic contact region 30c is connected to the first source and drain electrodes 80a and 80b. The first ohmic contact region 30c is doped with n-type impurities of a high concentration (n+), while the first LDD region 30b is doped with n-type impurities of a low concentration (n−). The first LDD region reduces leakage current by alleviating an electric field between the first gate electrode 50 and the first ohmic contact region 30c of the first semiconductor layer 30. Accordingly, a switching element of a pixel portion may be formed of an n-type LDD polycrystalline silicon TFT "I."

In FIG. 2B, CMOS switching elements of a driving portion include an n-type LDD polycrystalline silicon TFT "II" and a p-type polycrystalline silicon TFT "III." The buffer layer 25 is formed on the substrate 20. A second semiconductor layer 35 and a third semiconductor layer 40 spaced apart from each other are formed on the buffer layer 25. The gate insulating layer 45 is formed on the second semiconductor layer 35 and the third semiconductor layer 40. In addition, second and third gate electrodes 55 and 60 are formed on the gate insulating layer 45 over the second and third semiconductor layers 35 and 40, respectively. The interlayer insulating layer 70 is formed on the second and third gate electrodes 55 and 60. The interlayer insulating layer 70 has second set of contact holes 75a and 75b exposing the second semiconductor layer 35, and third set of contact holes 77a and 77b exposing the third semiconductor layer 40. Second source and drain electrodes 83a and 83b and third source and drain electrodes 87a and 87b are formed on the interlayer insulating layer 70. The second source and drain electrodes 83a and 83b are connected to the second semiconductor layer 35 through the second set of contact holes 75a and 75b, respectively, and the third source and drain electrodes 87a and 87b are connected to the third semiconductor layer 40 through the third set of contact holes 77a and 77b, respectively.

The second semiconductor layer 35 includes a second active region 35a corresponding to the second gate electrode 55, a second ohmic contact region 35c at both sides of the second active region 35a and a second LDD region 35b interposed between the second active region 35a and the second ohmic contact region 35c. The second ohmic contact region 35c is connected to the second source and drain electrodes 83a and 83b. The second ohmic contact region 35c is doped with n-type impurities of a high concentration (n+), while the second LDD region 35b is doped with n-type impurities of a low concentration (n−). In addition, the third semiconductor layer 40 includes a third active region 40a corresponding to the third gate electrode 60 and a third ohmic contact region 40c at both sides of the third active region 40a. The third ohmic contact region 40c is doped with p-type impurities of a high concentration (p+). Since holes are used as carriers in p-type elements, no leakage current occurs. Thus, an LDD region may be omitted in p-type elements. Accordingly, CMOS switching elements of a driving portion may be formed of an n-type LDD polycrystalline silicon TFT "II" and a p-type polycrystalline silicon TFT "III."

FIGS. 3A to 3F are schematic cross-sectional views showing a process of fabricating a switching element of a pixel portion according to the related art, and FIGS. 4A to 4F are schematic cross-sectional views showing a process of fabricating CMOS switching elements of a driving portion according to the related art.

In FIGS. 3A and 4A, a buffer layer 25 is formed on a substrate 20 by depositing an inorganic insulating material, such as silicon nitride (SiNx) or silicon oxide (SiO$_2$). After amorphous silicon (a-Si) is deposited on the buffer layer 25, the deposited amorphous silicon may be dehydrogenated and then crystallized to be a polycrystalline silicon layer. A first semiconductor layer 30 for a switching element "I" of a pixel portion, a second semiconductor layer 35 for an n-type switching element "II" of a driving portion and a third semiconductor layer 40 for a p-type switching element "III" of a driving portion are formed by patterning the polycrystalline silicon layer through a first mask process.

In FIGS. 3B and 4B, a gate insulating layer 45 of an inorganic insulating material, such as silicon nitride (SiNx) or silicon oxide (SiO$_2$) is formed on the first, second and third semiconductor layers 30, 35 and 40. First, second and third gate electrodes 50, 55 and 60 are formed on the gate insulating layer 45 by depositing and patterning a metallic material, such as molybdenum (Mo), through a second mask process. Then, the first, second and third semiconductor layers 30, 35 and 40 are doped with n-type impurities of a low concentration (n−) using the first, second and third gate electrodes 50, 55 and 60 as a doping mask. Accordingly, portions of each semiconductor layer 30, 35 and 40 directly under the corresponding gate electrode 50, 55 and 60 are not doped with impurities and remain intrinsic, and the other portions of each semiconductor layer 30, 35 and 40 are doped with n-type impurities of a low concentration (n−) to form LDD regions. The remaining intrinsic portions of each semiconductor layer 30, 35 and 40 function as an active region 30a, 35a and 40a for the switching elements.

In FIGS. 3C and 4C, first, second and third n+ photoresist (PR) patterns 62, 63 and 64 are formed on the first, second and third gate electrodes 50, 55 and 60 through a third mask process. Then, the entire surface of the substrate 20 is doped with n-type impurities of a high concentration (n+) using the first, second and third n+ PR patterns 62, 63 and 64 as a doping mask. The first n+ PR pattern 62 covers the first gate electrode 50 fully and portions of the first semiconductor layer 30 adjacent to the first gate electrode 50. Accordingly, the covered portions of the first semiconductor layer 30 are not doped with n-type impurities of a high concentration (n+) and remain as LDD regions, while the other portions of the first semiconductor layer 30 are doped with n-type impurities of a high concentration (n+). Similarly, since the second n+ PR pattern 63 covers the second gate electrode 55 fully and portions of the second semiconductor layer 35 adjacent to the second gate electrode 55, the covered portions of the second semiconductor layer 35 are not doped with n-type impurities of high concentration (n+) and remain as LDD regions, and the other portions of the second semiconductor layer 35 are doped with n-type impurities of a high concentration (n+). In addition, since the third n+ PR pattern 64 fully covers the third semiconductor layer 40, the third semiconductor layer 40 are not doped with n-type impurities of a high concentration (n+) and the LDD regions remain intact.

As a result, a first LDD region 30b and a first ohmic contact region 30c are obtained in the first semiconductor layer 30. Similarly, a second LDD region 35b and a second ohmic contact region 35c are obtained in the second semiconductor layer 35. After doping with n-type impurities, the first, second and third n+ PR patterns 62, 63 and 64 are removed.

In FIGS. 3D and 4D, first and second p+ PR patterns 65 and 66 are formed on the first and second gate electrodes 50 and 55, respectively, through a fourth mask process. Then, the entire surface of the substrate 20 is doped with p-type impurities of a high concentration (p+) using the first and second p+ PR patterns 65 and 66 as a doping mask. Since the first p+ PR pattern 65 completely covers the first semiconductor layer 30, the first semiconductor layer 30 is not doped with the high concentration of p-type impurities (p+). Similarly, since the second p+PR pattern 66 completely covers the second semiconductor layer 35, the second semiconductor layer 35 is not doped with the high concentration p-type impurities (p+).

In contrast to the first and second semiconductor layers 30 and 35, since the third semiconductor layer 40 is exposed without any p+ PR pattern, the third semiconductor layer 40 is doped with the high concentration p-type impurities (p+). During the doping step of high concentration of p-type impurities, since the third gate electrode 60 shields the high concentration p-type impurities, a portion of the third semiconductor layer 40 directly under the third gate electrode 60 is not doped with the high concentration of p-type impurities and remains as an intrinsic active region 40a. In addition, the p-type impurities having a high concentration (p+) compensate the n-type impurities having a low concentration (n−). Accordingly, exposed portions of the third semiconductor layer 40 become a third ohmic contact region 40c doped with a high concentration p-type impurities. After doping with p-type impurities, the first and second p+ PR patterns 65 and 66 are removed.

In FIGS. 3E and 4E, an interlayer insulating layer 70 of an inorganic insulating material, such as silicon nitride (SiNx) or silicon oxide (SiO$_2$) is formed on the first, second and third gate electrodes 50, 55 and 60. The first, second and third sets of contact holes 73a, 73b, 75a, 75b, 77a and 77b are formed in the interlayer insulating layer 70 and the gate insulating layer 45 through a fifth mask process. The first set of contact holes 73a and 73b exposes the third ohmic contact region 30c. The second set of contact holes 75a and 75b and the third set of contact holes 77a and 77b expose the second ohmic contact region 35c and the third ohmic contact region 40c, respectively.

Next, after sequentially depositing molybdenum (Mo) and aluminum (Al) on the interlayer insulating layer 70, first source and drain electrodes 80a and 80b, second source and drain electrodes 83a and 83b, and third source and drain electrodes 87a and 87b are formed through a sixth mask process. The first source and drain electrodes 80a and 80b are connected to the first ohmic contact region 30c through the first set of contact holes 73a and 73b, respectively. The second source and drain electrodes 83a and 83b are connected to the second ohmic contact region 35c through the second set of contact holes 75a and 75b, respectively, and the third source and drain electrodes 87a and 87b are connected to the third ohmic contact region 40c through the third set of contact holes 77a and 77b, respectively.

In FIGS. 3F and 4F, after a passivation layer 90 of silicon nitride (SiNx) is formed on the first source and drain electrodes 80a and 80b, the second source and drain electrodes 83a and 83b, and the third source and drain electrodes 87a and 87b, a drain contact hole 95 exposing the first drain electrode 80b is formed in the passivation layer 90 through a seventh mask process. In addition, a pixel electrode 97 is formed on the passivation layer 90 by depositing and patterning an indium-tin-oxide (ITO) layer through an eighth mask process. The pixel electrode 97 is connected to the first drain electrode 80b through the drain contact hole 95.

Accordingly, a first switching element "I" of an n-type LDD polycrystalline silicon TFT is formed in the pixel portion, and a second switching element "II" of an n-type LDD polycrystalline silicon TFT and a third switching element "III" of a p-type polycrystalline silicon TFT are formed in the driving portion through eight mask processes. A mask process includes a coating step of PR, an exposure step and a developing step. Therefore, as the number of mask processes increases, production cost and fabrication time increases. Moreover, production yield is reduced because of the increased possibility of a malformation due to the large number of processes.

SUMMARY OF THE INVENTION

Accordingly, the present invention is directed to a liquid crystal display (LCD) device including a polycrystalline silicon thin film transistor (p-Si TFT) and a method of fabricating the same that substantially obviates one or more of the problems due to limitations and disadvantages of the related art.

An object of the present invention is to provide a liquid crystal display (LCD) device having a driving unit and a method of fabricating the LCD device on a substrate.

Another object of the present invention is to provide an LCD device having a bottom gate polycrystalline silicon thin film transistor as a switching element for a pixel portion and a driving portion and a method of fabricating the LCD device.

Another object of the present invention is to provide an LCD device where a production cost is reduced and production yield increases, and a method of fabricating the LCD device.

Additional features and advantages of the invention will be set forth in the description which follows and in part will be apparent from the description, or may be learned by practice of the invention. These and other advantages of the invention will be realized and attained by the structure particularly pointed out in the written description and claims hereof as well as the appended drawings.

To achieve these and other advantages, an embodiment in accordance with the principles of the present invention provides a liquid crystal display device having a switching element in a pixel portion and a CMOS element in a driving portion including: a substrate; a gate electrode on the substrate; a gate insulating layer on the gate electrode; a polycrystalline silicon layer on the gate insulating layer, the polycrystalline silicon layer having an active region in a central portion corresponding to the gate electrode and an ohmic contact region at side portions of the active region; an interlayer insulating layer having a set of contact holes for contacting the polycrystalline silicon layer at the side portions; and source and drain electrodes spaced apart from each other on the interlayer insulating layer, the source and drain electrodes contacting the polycrystalline silicon layer through the set of contact holes.

In another aspect, an array substrate for a liquid crystal display device includes: a substrate; gate electrodes on the substrate; a gate insulating layer on the gate electrode; polycrystalline silicon layers on the gate insulating layer; interlayer insulating layers on the polycrystalline silicon layers in which ends of the interlayer insulating layers coincide with ends of the polycrystalline silicon layers; sets of contact holes for contacting the polycrystalline silicon layers; and pairs of source and drain electrodes spaced apart from each other on the interlayer insulating layers contacting the polycrystalline silicon layers through the sets of contact holes.

In another aspect, a method of fabricating an array substrate for a liquid crystal display device includes: providing a substrate having a pixel portion and a driving portion; forming a first gate electrode on the substrate in the pixel portion, and a second gate electrode and a third gate electrode on the substrate in the driving portion; forming a gate insulating layer on the first, second and third gate electrodes; forming a polycrystalline silicon layer on the gate insulating layer; doping a first portion of the polycrystalline silicon layer in the driving portion with p-type impurities; doping a second portion of the polycrystalline silicon layer in the driving portion and a third portion of the polycrystalline silicon layer in the pixel portion with n-type impurities; forming an interlayer insulating layer having contact holes exposing the first, second and third portions of the polycrystalline silicon layer; forming a metal layer on the interlayer insulating layer, the metal layer contacting the first, second and third portions of the polycrystalline silicon layer through the semiconductor contact holes; forming a first photoresist pattern having a first thickness and second photoresist pattern having a second thickness on the metal layer, the first thickness being greater than the second thickness; sequentially etching the metal layer and the polycrystalline silicon layer using the first and second photoresist patterns as an etch mask to form a first semiconductor layer in the pixel portion, and second and third semiconductor layers in the driving portion; partially removing the first and second photoresist patterns such that the first photoresist pattern has a third thickness smaller than the first thickness; etching the metal layer using the first photoresist pattern having the third thickness to form first source and drain electrodes in the pixel portion, and second and third source and drain electrodes in the driving portion; and forming a pixel electrode contacting the first drain electrode.

In another aspect, a method of fabricating an array substrate for a liquid crystal display device includes: providing a substrate having a pixel portion and a driving portion; forming a first gate electrode on the substrate in the pixel portion, and a second gate electrode and a third gate electrode on the substrate in the driving portion through a first mask process; sequentially forming a gate insulating layer and a polycrystalline silicon layer on an entire surface of the substrate having the first, second and third gate electrodes thereon; doping a first portion of the polycrystalline silicon layer in the driving portion with p-type impurities through a second mask process; doping a second portion of the polycrystalline silicon layer in the driving portion and a third portion of the polycrystalline silicon layer in the pixel portion with n-type impurities through a third mask process; forming an interlayer insulating layer having semiconductor contact holes on the polycrystalline silicon layer through a fourth mask process, the semiconductor contact holes exposing the first, second and third portions of the polycrystalline silicon layer; forming a metal layer on an entire surface of the substrate having the interlayer insulating layer thereon, the metal layer contacting the first, second and third portions of the polycrystalline silicon layer through the semiconductor contact holes; forming a first photoresist pattern having a first thickness and second photoresist pattern having a second thickness on the metal layer through a fifth mask process, the first thickness being greater than the second thickness; sequentially etching the metal layer and the polycrystalline silicon layer using the first and second photoresist patterns as an etch mask to form a first semiconductor layer in the pixel portion, and second and third semiconductor layers in the driving portion; partially removing the first and second photoresist patterns such that the first photoresist pattern has a third thickness smaller than the first thickness; etching the metal layer using the first photoresist pattern having the third thickness to form first source and drain electrodes in the pixel portion, and second and third source and drain electrodes in the driving portion; and forming a pixel electrode contacting the first drain electrode through a sixth mask process.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate an embodiment of the present invention and together with the description serve to explain the principles of that invention.

DETAILED DESCRIPTION OF THE PREFERRED EMBODIMENTS

Reference will now be made in detail to a preferred embodiment of the present invention, examples of which are shown in the accompanying drawings. Wherever possible, similar reference numbers will be used throughout the drawings to refer to the same or similar parts.

Figure 1:
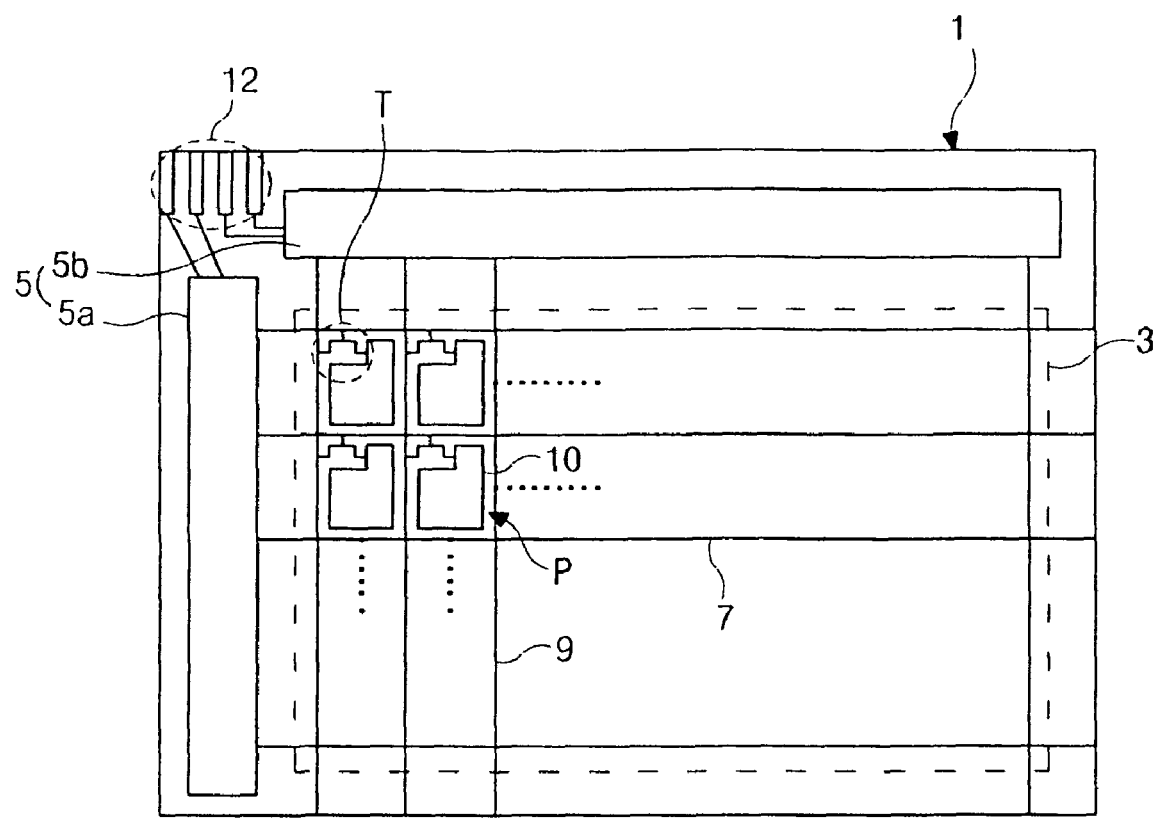
FIG. 1 is a schematic plan view of an array substrate including a driving circuit using polycrystalline silicon according to the related art.
Figure 2A:
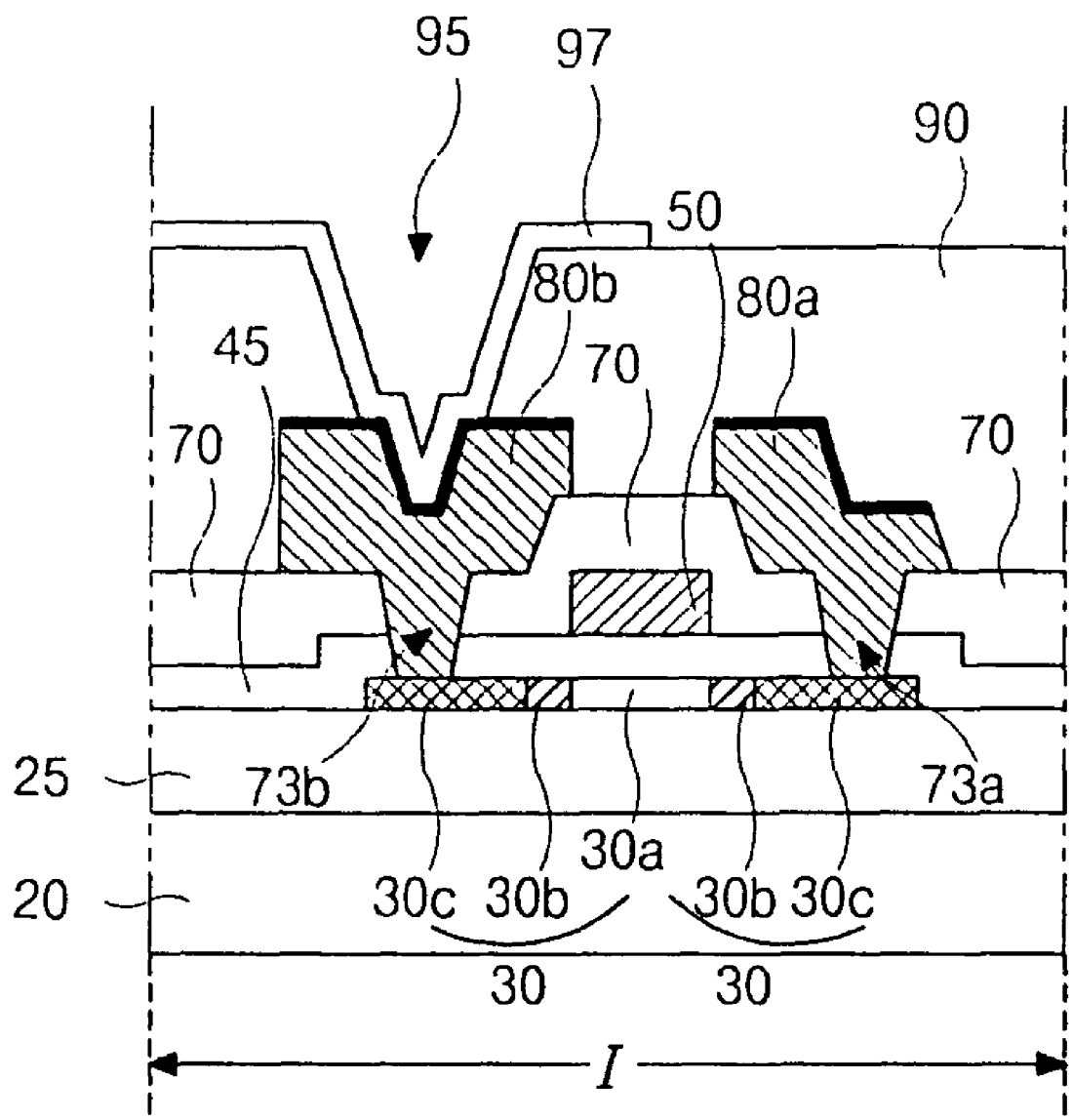
FIG. 2A is a schematic cross-sectional view showing a switching element of a pixel portion according to the related art.
Figure 2B:
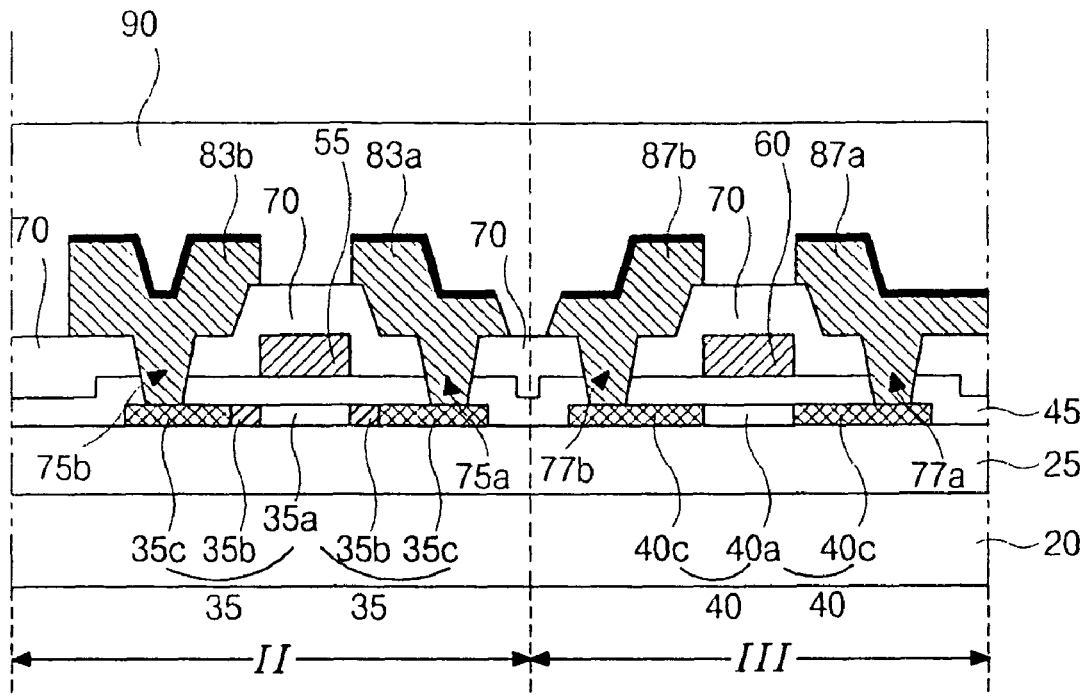
FIG. 2B is a schematic cross-sectional view showing CMOS switching elements of a driving portion according to the related art.
Figure 3A:
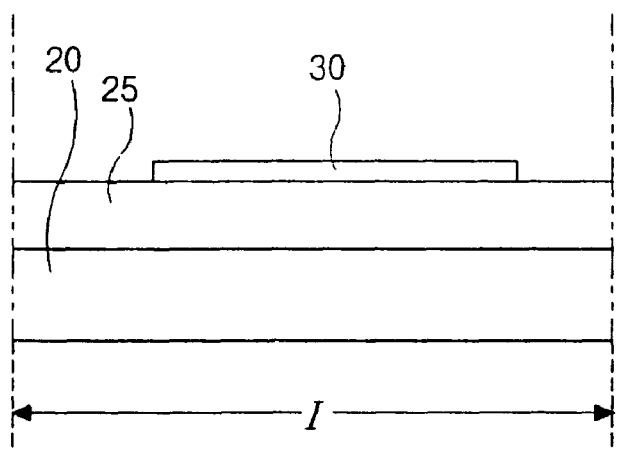
FIGS. 3A to 3F are schematic cross-sectional views showing a process of fabricating a switching element of a pixel portion according to the related art.
Figure 3B:
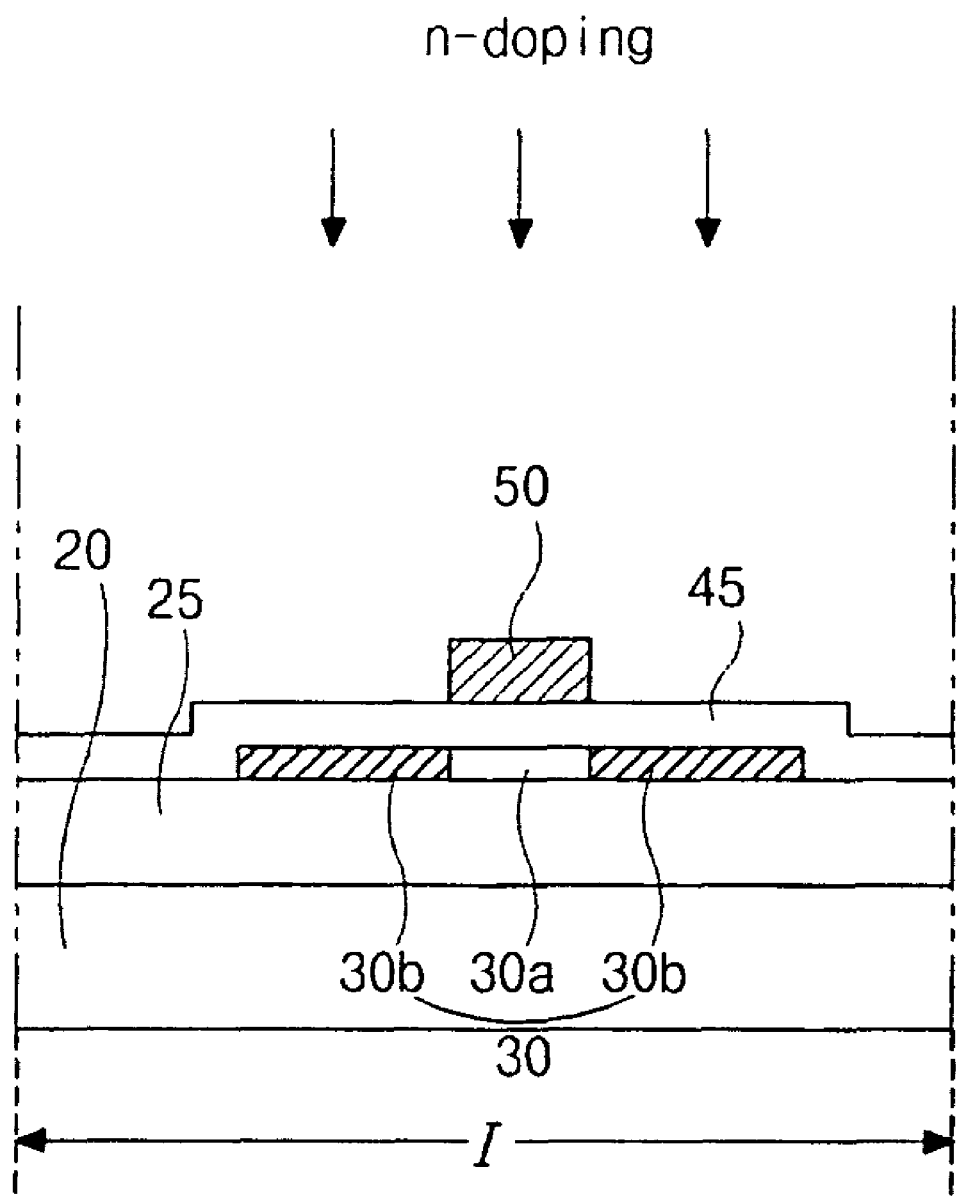
Figure 3C:
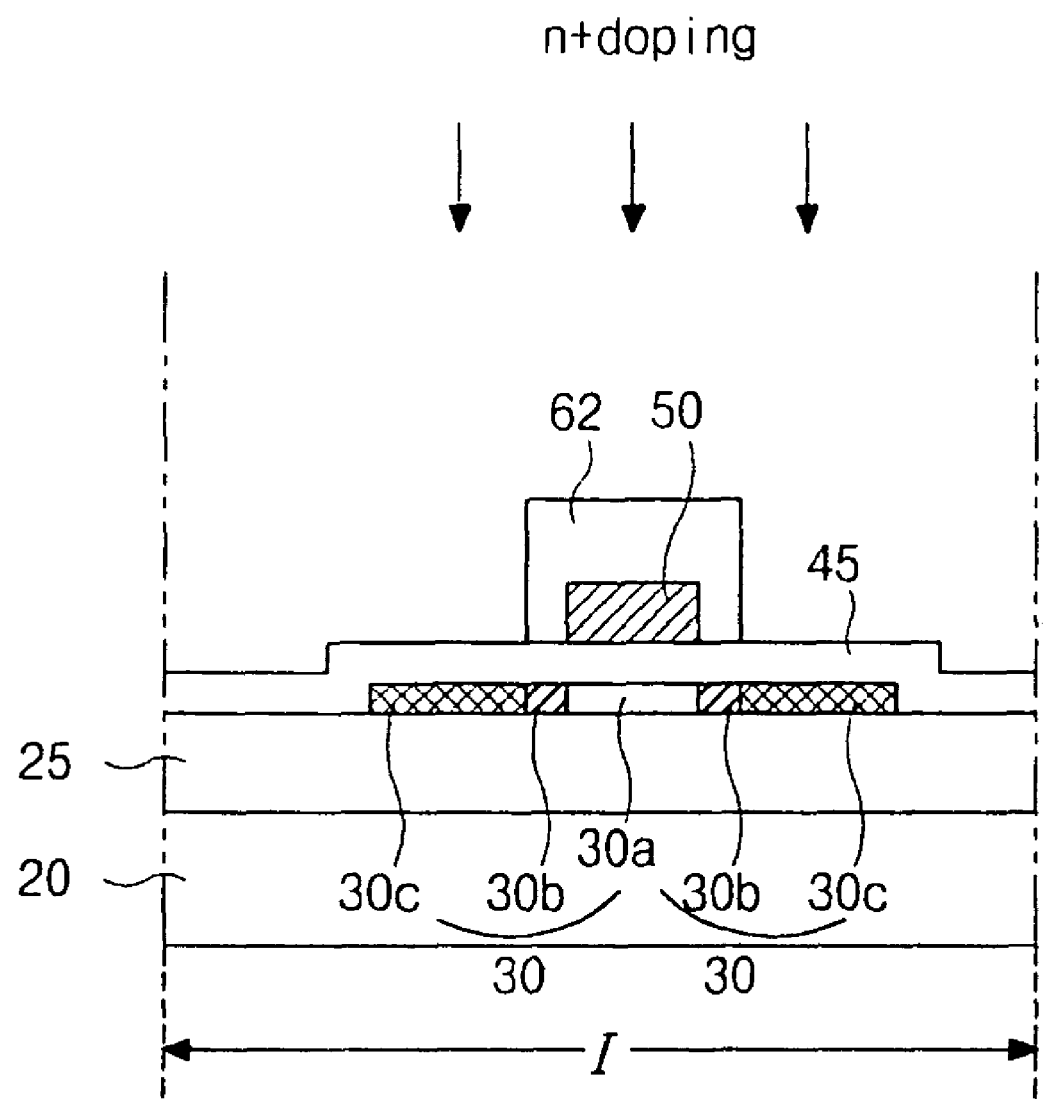
Figure 3D:
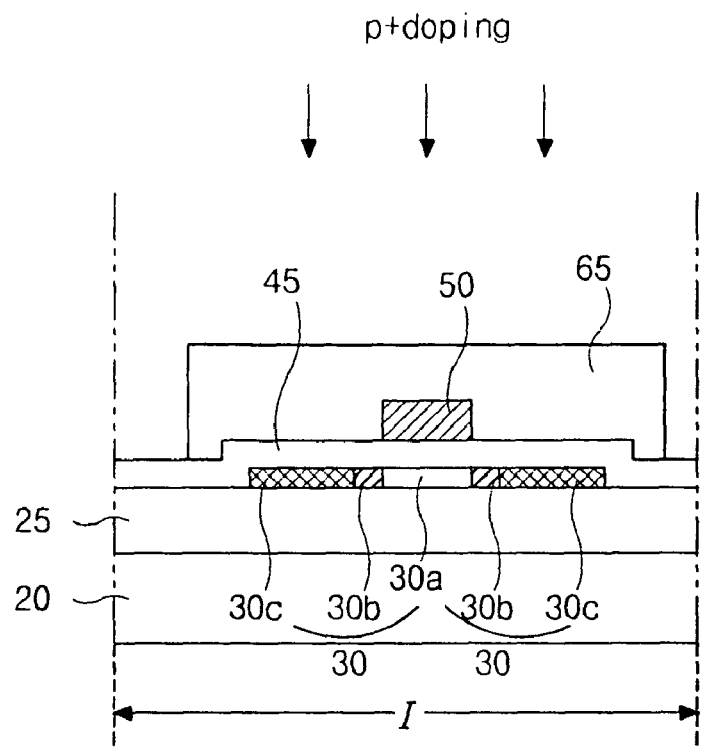
Figure 3E:
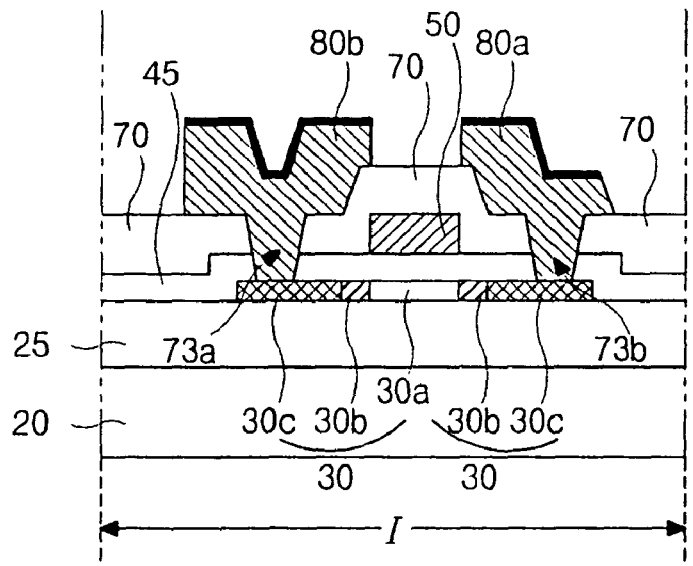
Figure 3F:
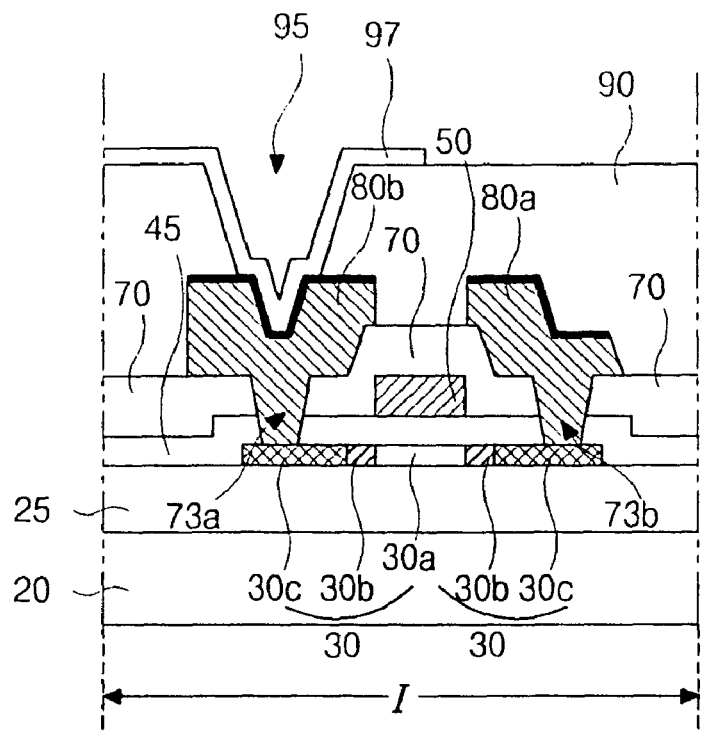
Figure 4A:
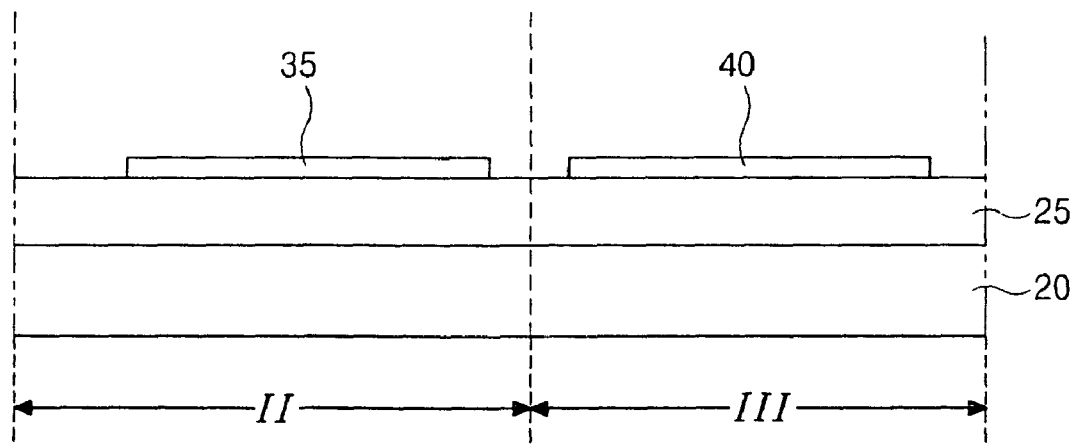
FIGS. 4A to 4F are schematic cross-sectional views showing a process of fabricating CMOS switching elements of a driving portion according to the related art.
Figure 4B:
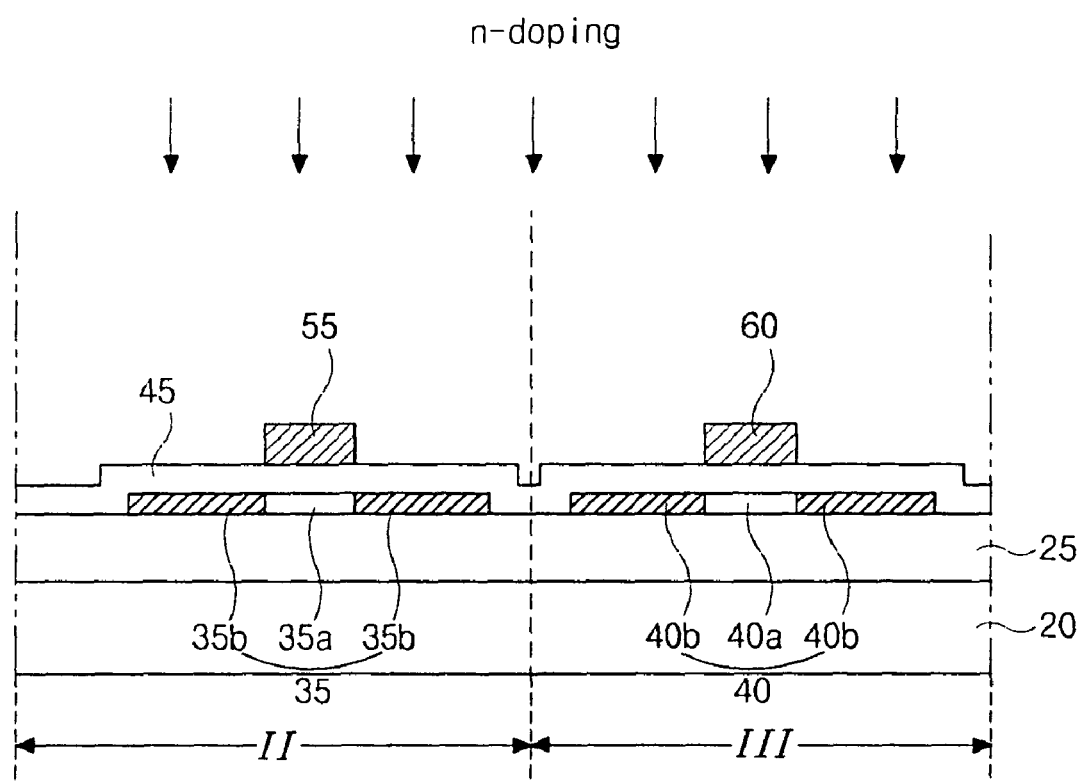
Figure 4C:
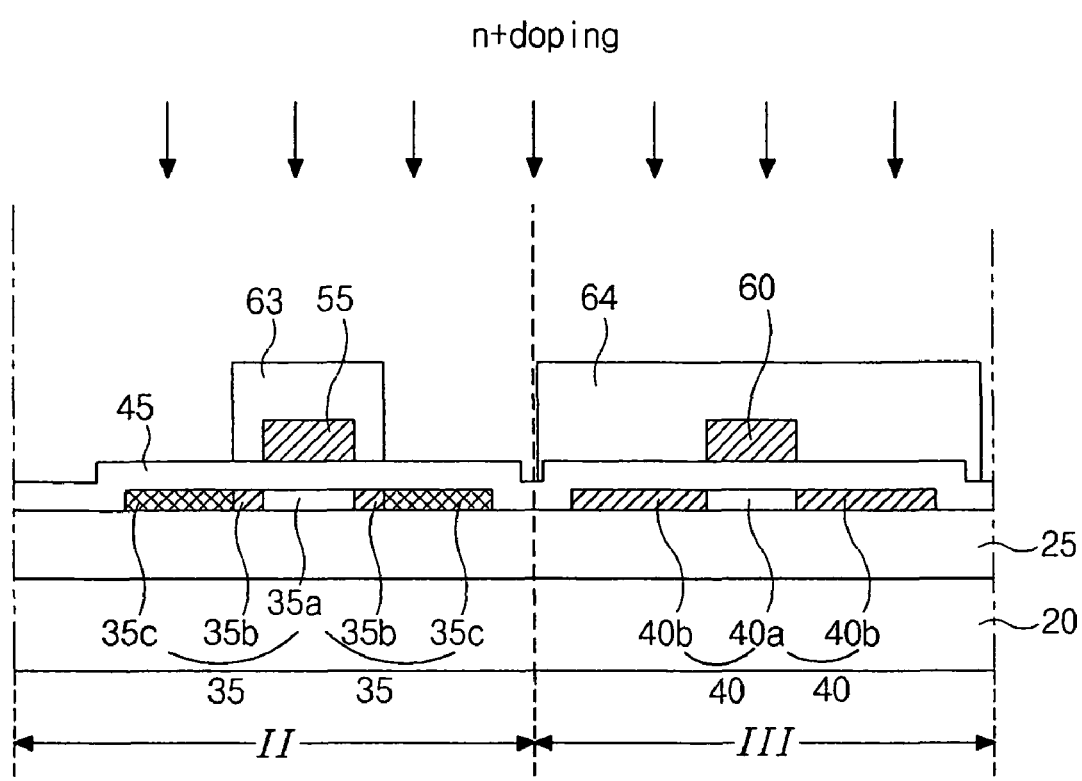
Figure 4D:
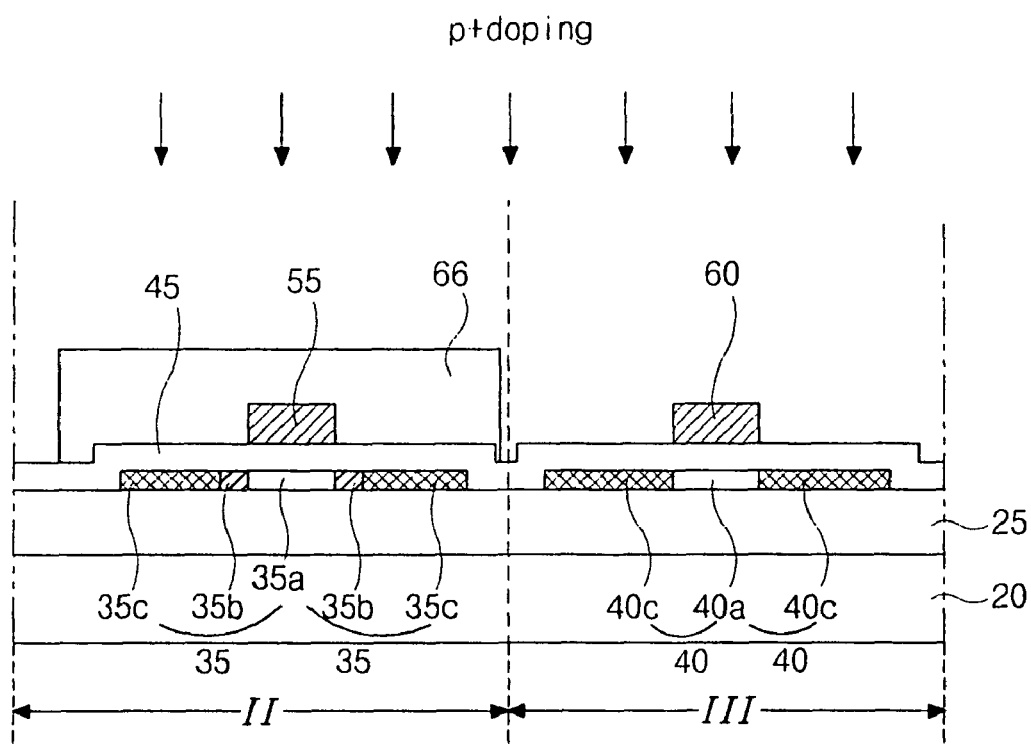
Figure 4E:
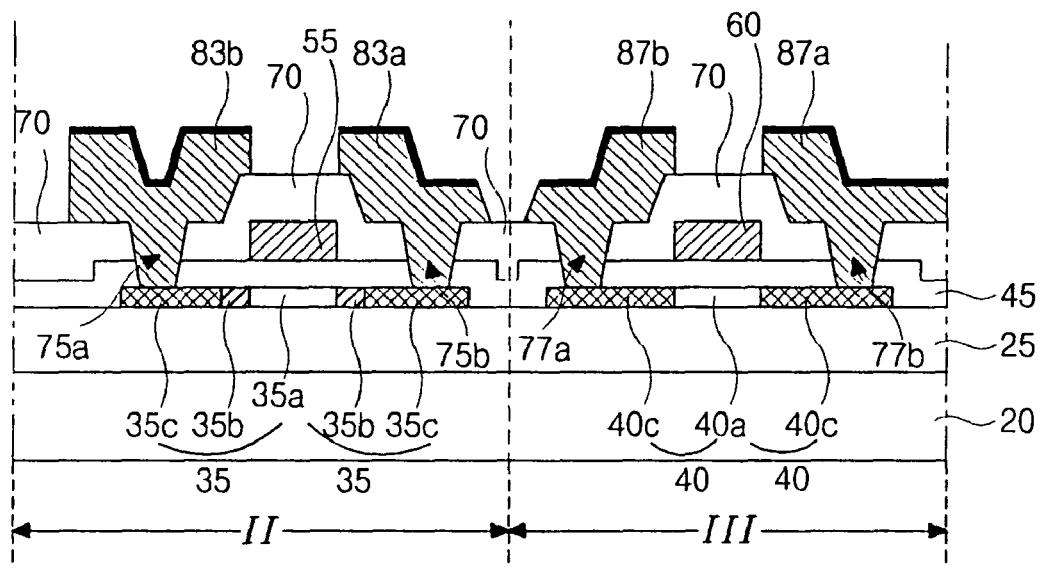
Figure 4F:
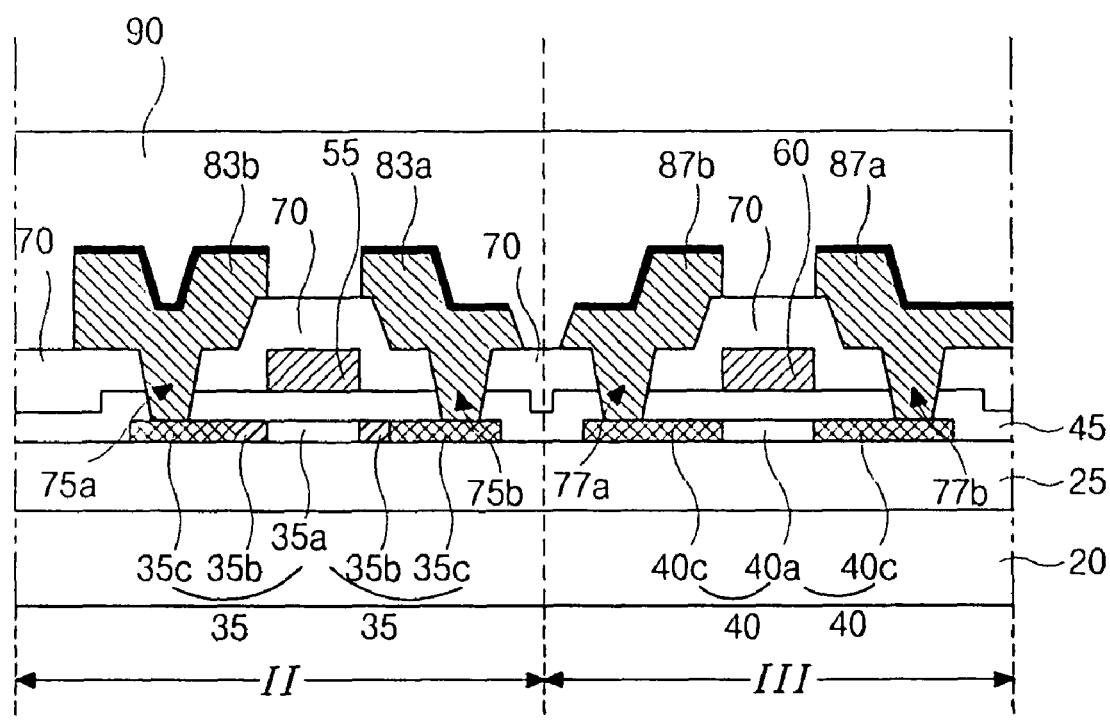
Figure 5A:
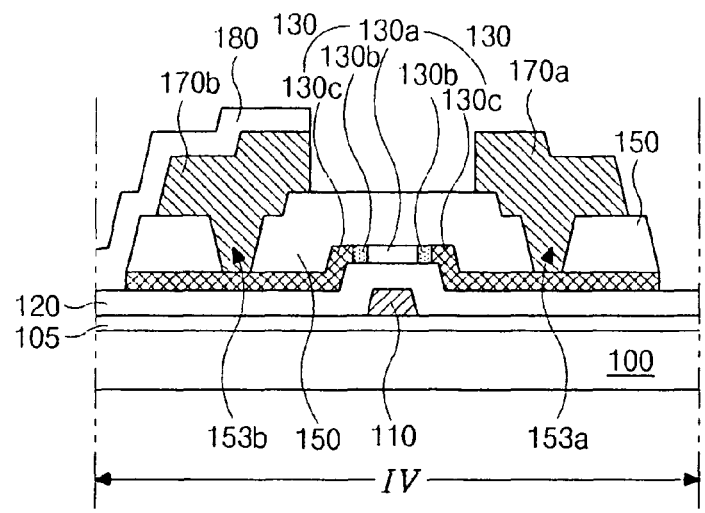
FIG. 5A is a schematic cross-sectional view showing a switching element in a pixel portion of an array substrate for a liquid crystal display device according to an embodiment of the present invention.
Figure 5B:
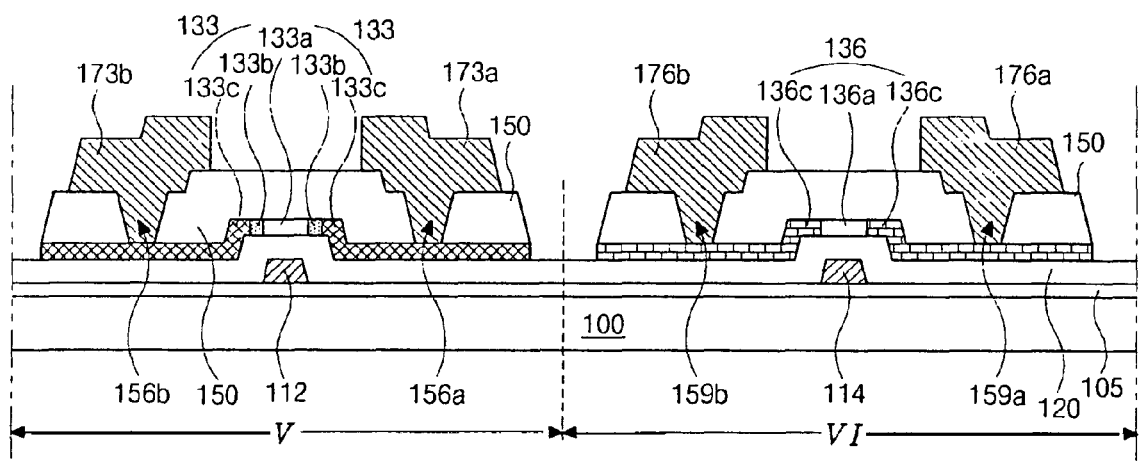
FIG. 5B is a schematic cross-sectional view showing CMOS switching elements in a driving portion of an array substrate for a liquid crystal display device according to an embodiment of the present invention.

FIG. 5A is a schematic cross-sectional view showing a switching element in a pixel portion of an array substrate for a liquid crystal display device according to an embodiment of the present invention and FIG. 5B is a schematic cross-sectional view showing CMOS switching elements in a driving portion of an array substrate for a liquid crystal display device according to an embodiment of the present invention.

As shown in FIG. 5A, a buffer layer 105 is formed on a substrate 100. The buffer layer 105 may be formed of an inorganic insulating material, such as silicon nitride (SiNx) or silicon oxide ($SiO_2$). A first gate electrode 110 is formed on the buffer layer 105. The first gate electrode 110 may be formed of a single layer or multiple layers, including a metallic material, such as chromium (Cr), aluminum (Al) or molybdenum (Mo). The first gate electrode 110 is used for a switching element "IV" in a pixel portion of the substrate 100. A gate insulating layer 120 is formed on the first gate electrode 110 and a first semiconductor layer 130 is formed on the gate insulating layer 120 over the first gate electrode 110. An interlayer insulating layer 150 is formed on the first semiconductor layer 130, and first source and drain electrodes 170a and 170b are formed on the interlayer insulating layer 150. The interlayer insulating layer 150 has a first set of contact holes 153a and 153b exposing the first semiconductor layer 130.

The first semiconductor layer 130 includes a first active region 130a corresponding to the first gate electrode 110, a first ohmic contact region 130c at both sides of the first active region 130a and a first lightly doped drain (LDD) region 130b interposed between the first active region 130a and the first ohmic contact region 130c. The first ohmic contact region 130c is connected to the first source and drain electrodes 170a and 170b through the first set of contact holes 153a and 153b. The first ohmic contact region 130c is doped with n-type impurities of a high concentration (n+), while the first LDD region 130b is doped with n-type impurities of a low concentration (n−). The first LDD region 130b reduces current leakage by alleviating an electric field between the first gate electrode 110 and the first ohmic contact region 130c of the first semiconductor layer 130. Accordingly, a switching element of a pixel portion may be formed of an n-type LDD polycrystalline silicon thin film transistor (TFT) "IV." In addition, a pixel electrode 180 is formed on the first drain electrode 170b. Although though not shown in FIG. 5A, the pixel electrode 180 may be formed in a pixel region defined by a gate line and a data line crossing each other.

In FIG. 5B, CMOS switching elements of a driving portion include an n-type LDD polycrystalline silicon TFT "V" and a p-type polycrystalline silicon TFT "VI." The buffer layer 105 is formed on the substrate 100. The buffer layer 105 may be formed of an inorganic insulating material, such as silicon nitride (SiNx) or silicon oxide ($SiO_2$). A second gate electrode 112 and a third gate electrode 114 are formed on the buffer layer 105, and the gate insulating layer 120 is formed on the second and third gate electrodes 112 and 114. The second and third gate electrodes 112 and 114 may be formed of a single layer or multiple layers, including a metallic material, such as chromium (Cr), aluminum (Al) or molybdenum (Mo). In addition, a second semiconductor layer 133 is formed on the gate insulating layer 120 over the second gate electrode 112 and a third semiconductor layer 136 is formed on the gate insulating layer 120 over the third gate electrode 114. The interlayer insulating layer 150 is formed on the second and third semiconductor layers 133 and 136. The interlayer insulating layer 150 has a second set of contact holes 156a and 156b exposing the second semiconductor layer 133 and a third set of contact holes 159a and 159b exposing the third semiconductor layer 136. Second source and drain electrodes 173a and 173b and third source and drain electrodes 176a and 176b are formed on the interlayer insulating layer 150. The second source and drain electrodes 173a and 173b are connected to the second semiconductor layer 133 through the second set of contact holes 156a and 156b, respectively, and the third source and drain electrodes 176a and 176b are connected to the third semiconductor layer 136 through the third set of contact holes 176a and 176b, respectively.

The second semiconductor layer 133 includes a second active region 133a corresponding to the second gate electrode 112, a second ohmic contact region 133c at both sides of the second active region 133a and a second LDD region 133b interposed between the second active region 133a and the second ohmic contact region 133c. The second ohmic contact region 133c is connected to the second source and drain electrodes 173a and 173b. The second ohmic contact region 133c is doped with n-type impurities of a high concentration (n+), while the second LDD region 133b is doped with n-type impurities of a low concentration (n−). In addition, the third semiconductor layer 136 includes a third active region 136a corresponding to the third gate electrode 114 and a third ohmic contact region 136c at both sides of the third active region 136a. The third ohmic contact region 136c is doped with p-type impurities of a high concentration (p+). The LDD regions may be omitted in p-type elements because current leakage does not occur since holes are used as carriers in p-type elements. Accordingly, CMOS switching elements of a driving portion may be formed of an n-type LDD polycrystalline silicon TFT "V" and a p-type polycrystalline silicon TFT "VI."

FIGS. 6A to 6M are schematic cross-sectional views showing a process of fabricating a switching element in a pixel portion of an array substrate for a liquid crystal display device according to an embodiment of the present invention, and FIGS. 7A to 7M are schematic cross-sectional views showing a process of fabricating CMOS switching elements in a driving portion of an array substrate for a liquid crystal display device according to an embodiment of the present invention.

Figure 6A:
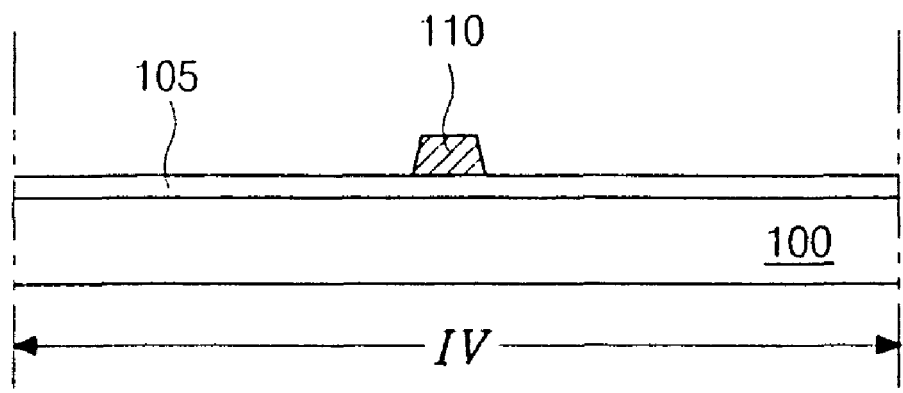
FIGS. 6A to 6M are schematic cross-sectional views showing a process of fabricating a switching element in a pixel portion of an array substrate for a liquid crystal display device according to an embodiment of the present invention.
Figure 7A:
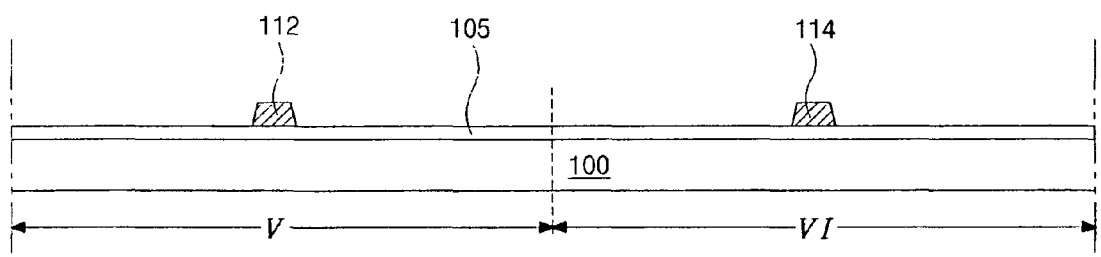
FIGS. 7A to 7M are schematic cross-sectional views showing a process of fabricating CMOS switching elements in a driving portion of an array substrate for a liquid crystal display device according to an embodiment of the present invention.

In FIGS. 6A and 7A, a buffer layer 105 is formed on a substrate 100 by depositing an inorganic insulating material such, as silicon nitride (SiNx) or silicon oxide ($SiO_2$). Then, first, second and third gate electrodes 110, 112 and 114 are formed on the buffer layer 105 by depositing and patterning a metallic material, such as chromium (Cr), aluminum (Al) or molybdenum (Mo) through a first mask process. The first gate electrode 110 is disposed at a pixel portion of the substrate 100, and the second and third gate electrodes 112 and 114 are disposed in a driving portion of the substrate 100 of a periphery of the pixel portion.

Figure 6B:
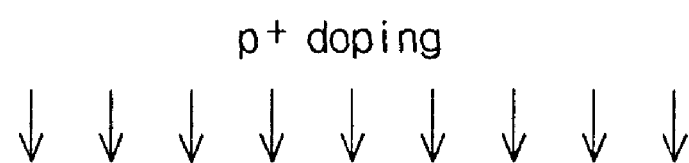
Figure 6B:
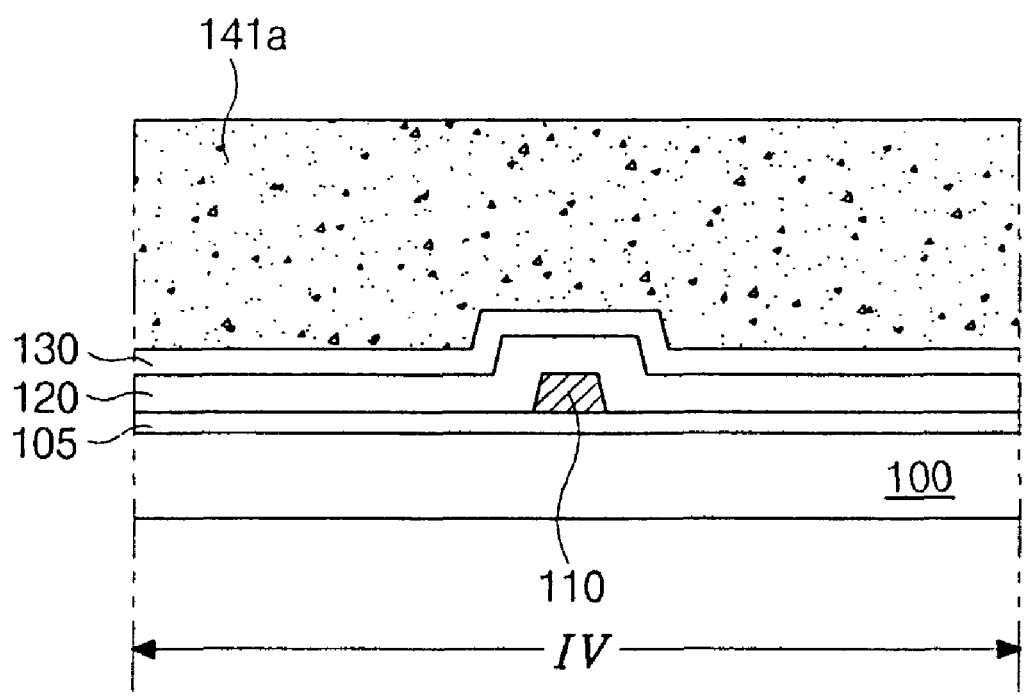
Figure 7B:
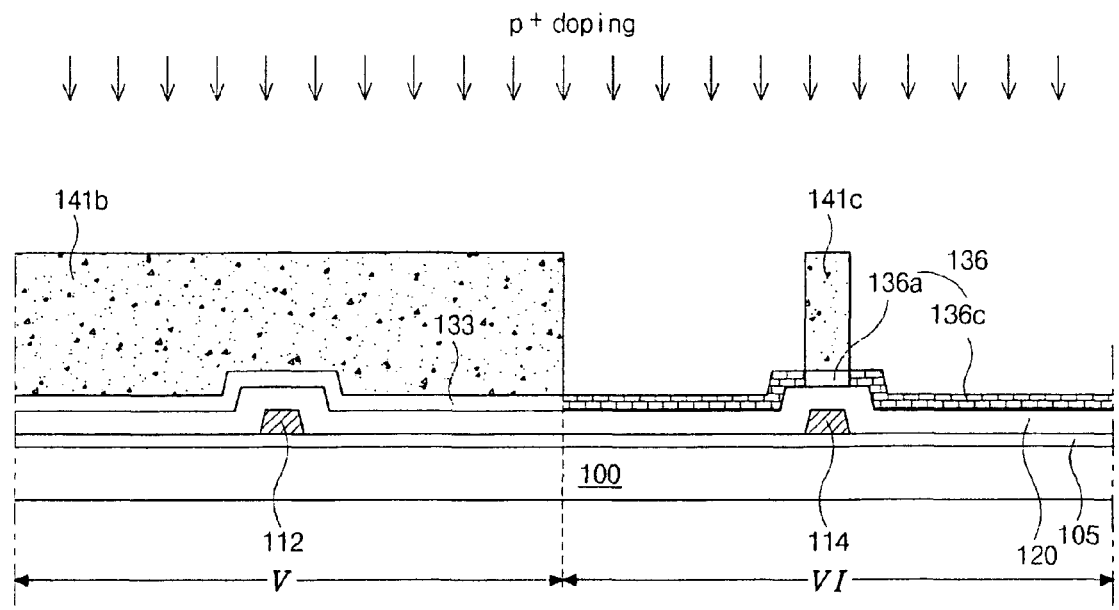

In FIGS. 6B and 7B, a gate insulating layer 120 of an inorganic insulating material, such as silicon nitride (SiNx) or silicon oxide ($SiO_2$) is formed on the first, second and third gate electrodes 110, 112 and 115. Afterwards, amorphous silicon (a-Si) is deposited on the gate insulating layer 120, the deposited amorphous silicon may be dehydrogenated and then the first, second and third semiconductor layers 130, 133 and 136 are transformed into polycrystalline silicon. The first, second and third semiconductor layers 130, 133 and 136 have a central portion directly above their respective gate electrodes 110, 112 and 114 and side portions at the sides of the gate electrodes 110, 112 and 114. The first semiconductor layer 130 corresponds to the pixel portion, while the second and third semiconductor layers 133 and 136 correspond to the driving portion. The first, second and third semiconductor layers 130, 133 and 136 are formed over the entire surface of the substrate 100 and may be patterned in a following step. Then, first, second and third p+ photoresist (PR) patterns 141a, 141b and 141c are formed on the first, second and third semiconductor layers 130, 133 and 136, respectively, through a second mask process. Then, the entire surface of the substrate 100 is doped with p-type impurities of a first concentration (p+) using the first, second and third p+ PR patterns 141a, 141b and 141c as a doping mask. For example, the first concentration of p-type impurities may be within a range of about $1 \times 10^{15}$ cm$^{-2}$ to about $6 \times 10^{16}$ cm$^{-2}$.

Since the first p+ PR pattern 141a completely covers the first semiconductor layer 130, the first semiconductor layer 130 is not doped with the p-type impurities (p+) and remains intrinsic. Similarly, since the second p+ PR pattern 141b completely covers the second semiconductor layer 133, the second semiconductor layer 133 is not doped with the p-type impurities (p+) and remains intrinsic. In addition, the third p+ PR pattern 141c covers a portion of the third semiconductor layer 136 corresponding to the third gate electrode 114 and the other portions of the third semiconductor layer 136 are exposed. Accordingly, the portion corresponding to the third gate electrode 114 is not doped with the p-type impurities and remains intrinsic to be a third active region 136a, while the other portions are doped with the p-type impurities to be a third ohmic contact region 136c. After doping with the high concentration p-type impurities (p+), the first, second and third p+ PR patterns 141a, 141b and 141c are removed by ashing or stripping.

Figure 6C:
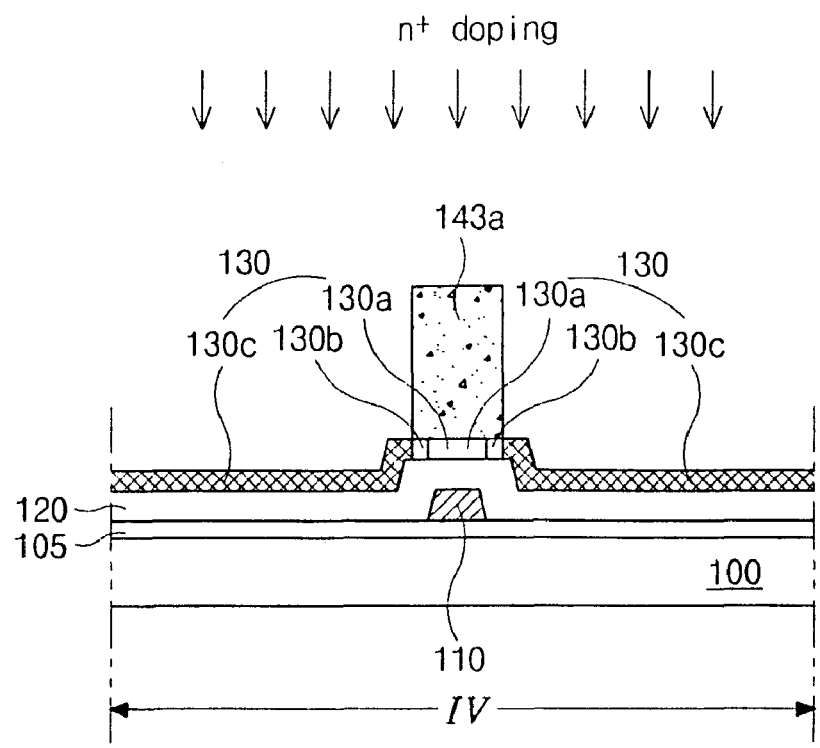
Figure 7C:
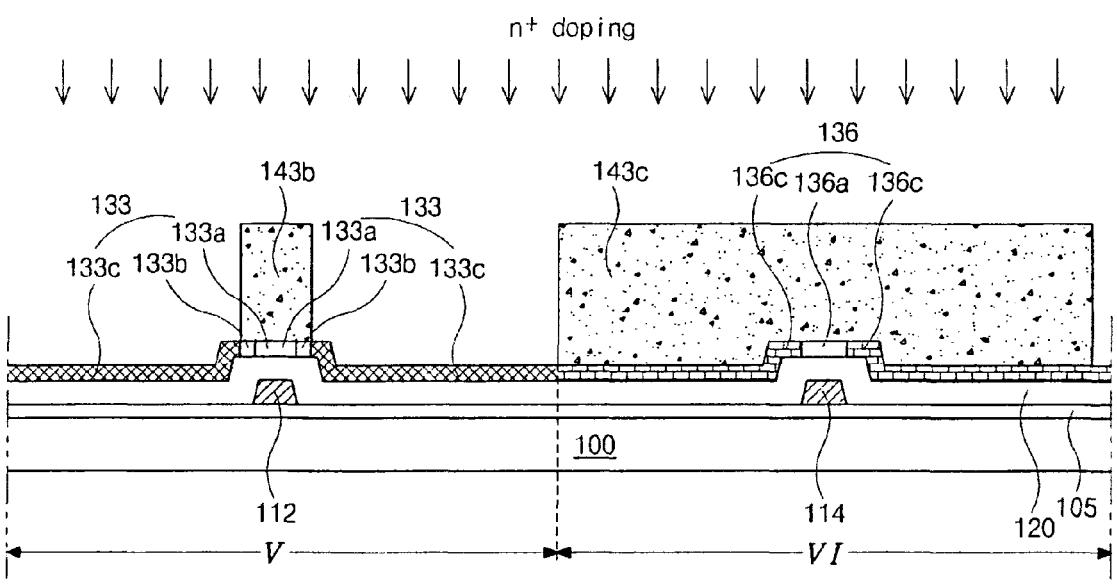

In FIGS. 6C and 7C, first, second and third n+ PR patterns 143a, 143b and 143c are formed on the first, second and third semiconductor layers 130, 133 and 136, respectively, through a third mask process. Then, the entire surface of the substrate 100 is doped with n-type impurities of a second concentration (n+) using the first, second and third n+ PR patterns 143a, 143b and 143c as a doping mask. For example, the second concentration of n-type impurities may be within a range of about $1 \times 10^{15}$ cm$^{-2}$ to about $9 \times 10^{16}$ cm$^{-2}$.

The first n+ PR pattern 143a covers an central portion of the first semiconductor layer 130 corresponding to the first gate electrode 110 and an additional portion of the first semiconductor layer 130 for a first LDD region 130b in a subsequent step. Accordingly, the covered central portions of the first semiconductor layer 130 are not doped with n-type impurities (n+) and remain intrinsic, while the other portions of the first semiconductor layer 130, including the side portions are doped with the n-type impurities (n+) to be a first ohmic contact region 130c. Similarly, since the second n+ PR pattern 143b covers an central portion of the second semiconductor layer 130 corresponding to the second gate electrode 112 and an additional portion for a second LDD region 133b in a subsequent step, the covered central portions of the second semiconductor layer 133 are not doped with n-type impurities (n+) and remain intrinsic, and the other portions of the second semiconductor layer 133, including the side portions are doped with the n-type impurities (n+) to be a second ohmic contact region 133c. In addition, since the third n+ PR pattern 143c completely covers the third semiconductor layer 136, the third semiconductor layer 136 is not doped with n-type impurities of the second concentration (n+). As a result, the first ohmic contact region 130c of the first semiconductor layer 130 and the second ohmic contact region 133c of the second semiconductor layer 133 are obtained by doping with n-type impurities of the second concentration (n+).

Figure 6D:
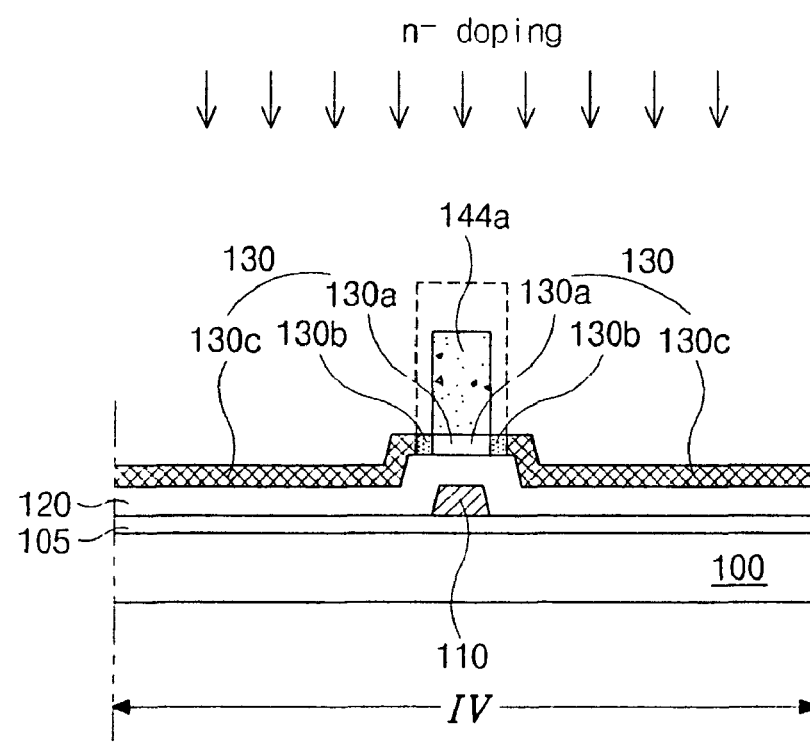
Figure 7D:
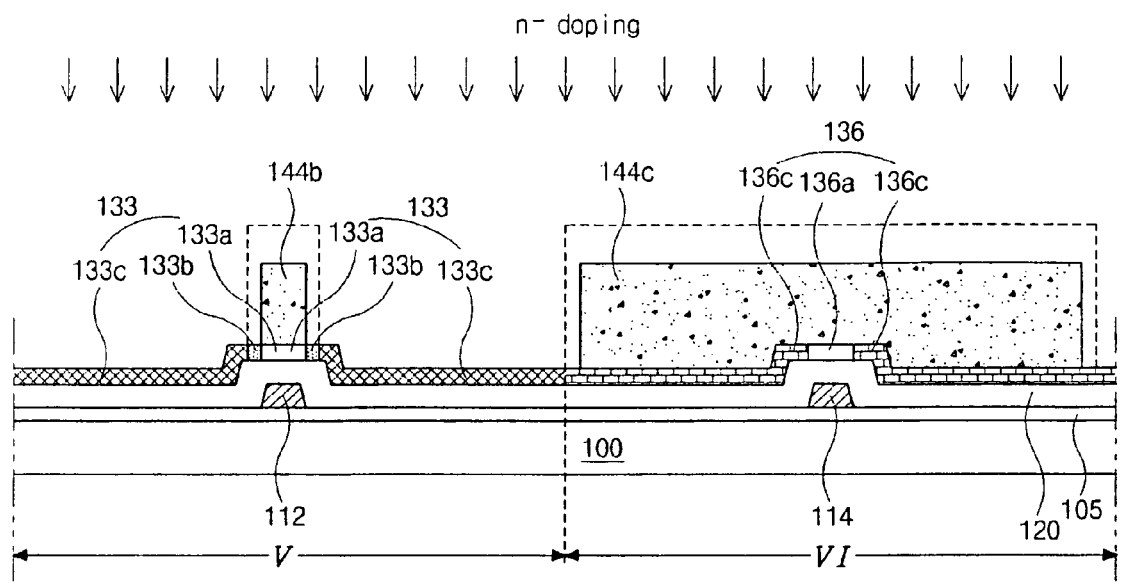

In FIGS. 6D and 7D, the first, second and third n+ PR patterns 143a, 143b and 143c are partially etched away to be a first, second and third n− PR patterns 144a, 144b and 144c, respectively. For example, the first, second and third n+ PR patterns 143a, 143b and 143c may be etched using a dry etching method. The first n− PR pattern 144a is smaller than the first n+ PR pattern 143a. Accordingly, a height and a width of the first n− PR pattern 144a are smaller than those of the first n+ PR pattern 143a, thereby a volume of the first n+ PR pattern 143a reduced. Similarly, the second n− PR pattern 144b is smaller than the second n+ PR pattern 143a and the third n− PR pattern 144c is smaller than the third n+ PR pattern 143c. Then, the entire surface of the substrate 100 is doped with n-type impurities of a third concentration (n−). For example, the third concentration of n-type impurities may be within a range of about $1 \times 10^{13}$ cm$^{-2}$ to about $1 \times 10^{14}$ cm$^{-2}$.

The first n− PR pattern 144a covers only the portion of the first semiconductor layer 130 corresponding to the first gate electrode 110 and the additional portion of the first semiconductor layer 130 for first LDD regions 130b are exposed. Accordingly, the covered central portion of the first semiconductor layer 130 is not doped with n-type impurities (n−) and remains intrinsic to be a first active region 130a, while the other portions of the first semiconductor layer 130, including the side portions, are doped with the n-type impurities (n−). Since the second concentration of n-type impurities for the first ohmic contact region 130a is higher than the third concentration, the first ohmic contact region 130a is not affected by the n-type impurities of the third concentration. However, the additional portion of the first semiconductor layer 130a is doped with the n-type impurities to be first LDD regions 130b having the third concentration of n-type impurities (n−) above and at the sides of the gate 110. Similarly, the second n− PR pattern 144b covers only the portion of the second semiconductor layer 133 corresponding to the second gate electrode 112 and the additional portion of the second semiconductor layer 133 for second LDD regions 133b are exposed. Accordingly, the covered central portion of the second semiconductor layer 133 is not doped with n-type impurities (n−) and remains intrinsic to be a second active region 133a, while the other portions of the second semiconductor layer 133, including the side portions, are doped with the n-type impurities (n−). The additional portion of the second semiconductor layer 133a is doped with the n-type impurities to be a second LDD region 133b having the third concentration of n-type impurities (n−). The third n− PR pattern 144c covers most of the third semiconductor layer 136 and an exposed portion of the third semiconductor layer 136 is doped with p-type impurities of the first concentration higher than the third concentration. Accordingly, the third semiconductor layer 136 is not affected by the n-type impurities of the third concentration.

As a result, the first LDD region 130b of the first semiconductor layer 130 and the second LDD region 133b in an central portion of the second semiconductor layer 133 are obtained by doping with n-type impurities of the third concentration. After doping with n-type impurities, the first, second and third n− PR patterns 144a, 144b and 144c are removed by ashing or stripping. In addition, after removing the first, second and third n− PR patterns 144a, 144b and 144c, the first, second and third semiconductor layers 130, 133 and 136 may be activated using heat or laser.

Figure 6E:
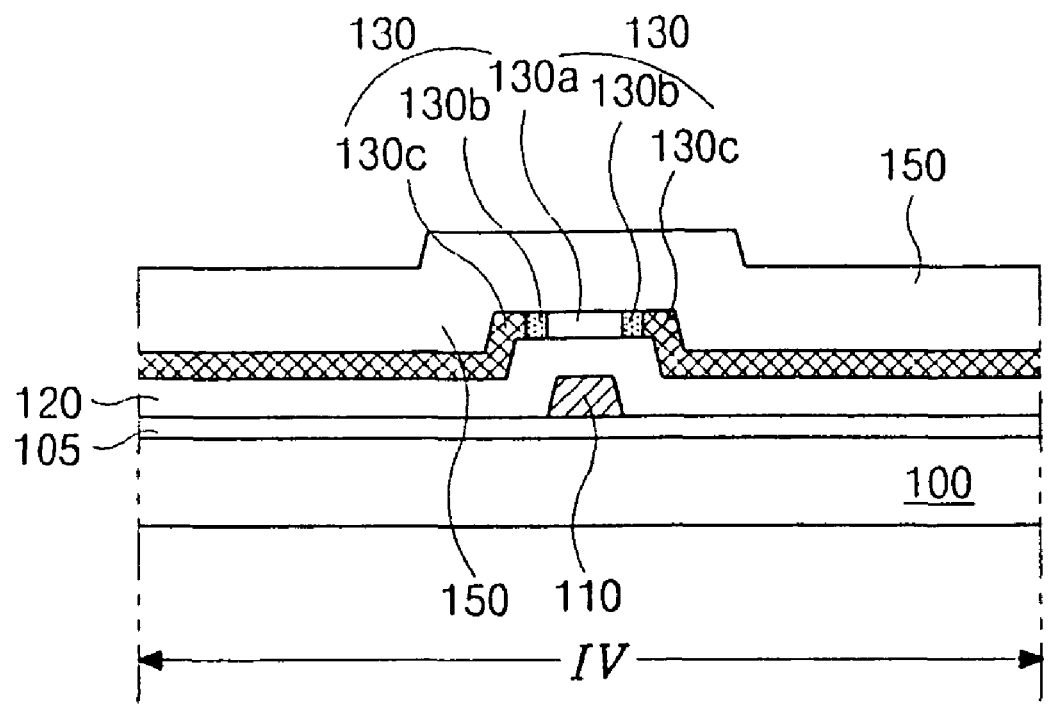
Figure 7E:
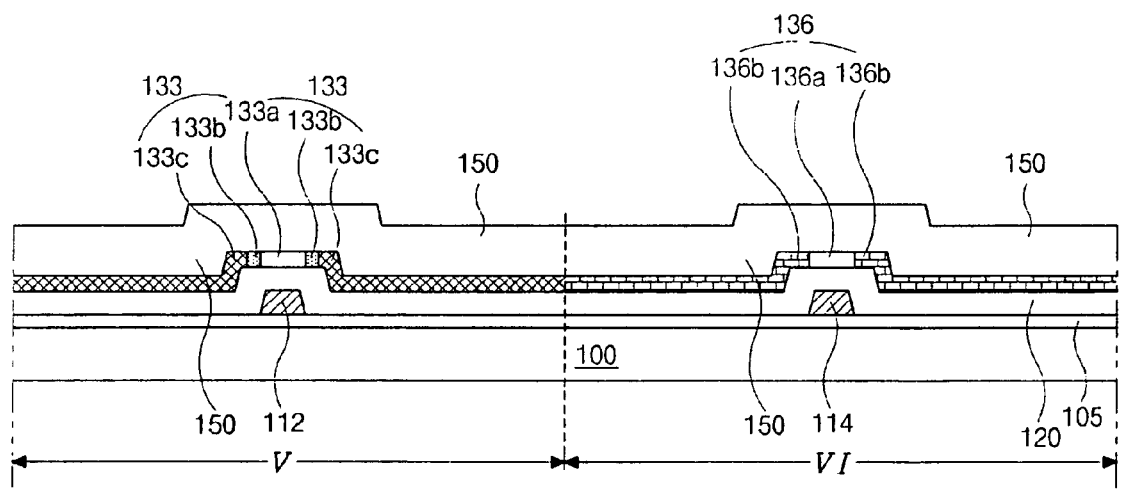

In FIGS. 6E and 7E, an interlayer insulating layer 150 is formed on the first, second and third semiconductor layers 130, 133 and 136. The interlayer insulating layer 150 may include an inorganic insulating material, such as silicon nitride (SiNx) or silicon oxide (SiO$_2$). The interlayer insulating layer 150 protects a channel region of a TFT during a subsequent step of forming source and drain electrodes.

Figure 6F:
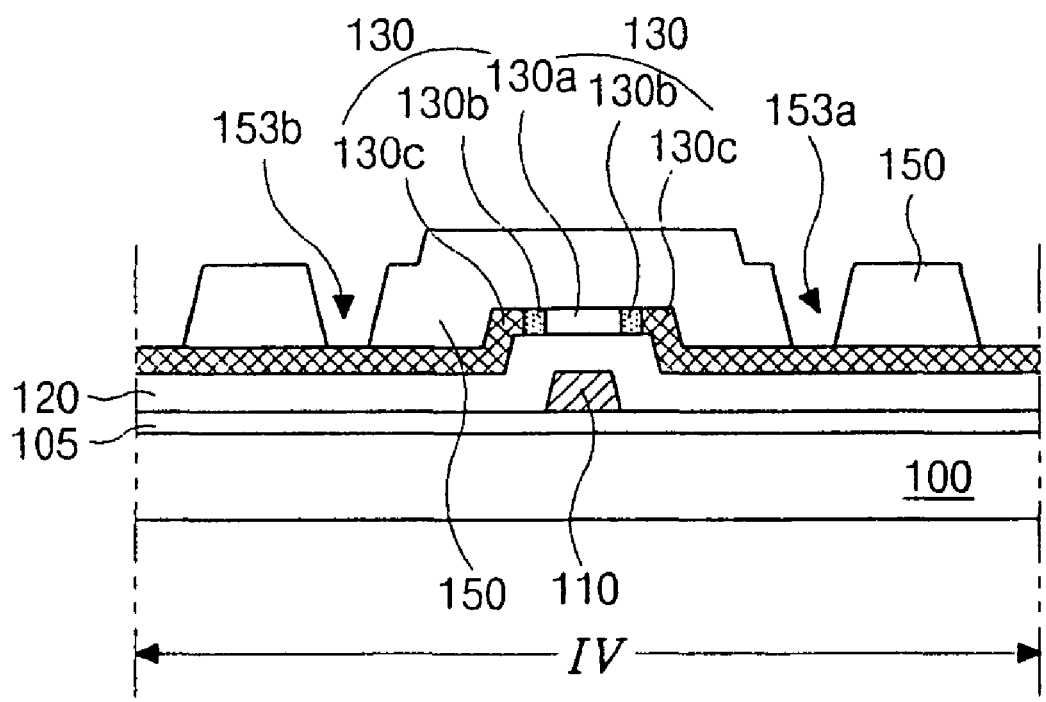
Figure 7F:
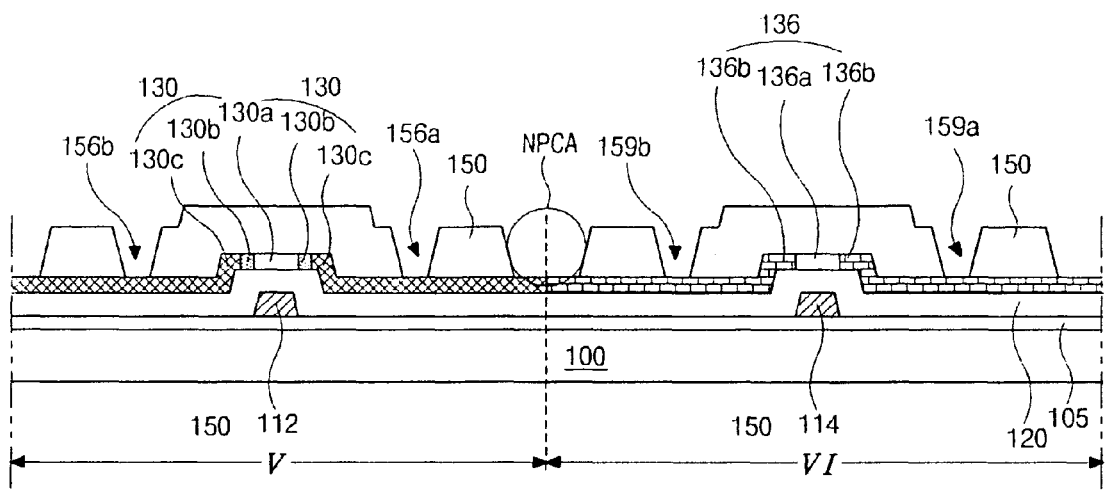

In FIGS. 6F and 7F, first, second and third semiconductor contact holes 153a, 153b, 156a, 156b, 159a and 159b are formed in the interlayer insulating layer 150 through a fourth mask process. The first semiconductor contact holes 153a and 153b expose the first ohmic contact region 130c of the first semiconductor layer 130. In addition, the second semiconductor contact holes 156a and 156b expose the second ohmic contact region 133c of the second semiconductor layer 133, and the third semiconductor contact holes 159a and 159b expose the third ohmic contact region 136c of the third semiconductor layer 136. Moreover, boundary portions of the pixel portion and the driving portion are exposed, and a border portion "NPCA" between the switching elements of the driving portion is also exposed through the interlayer insulating layer 150.

Figure 6G:
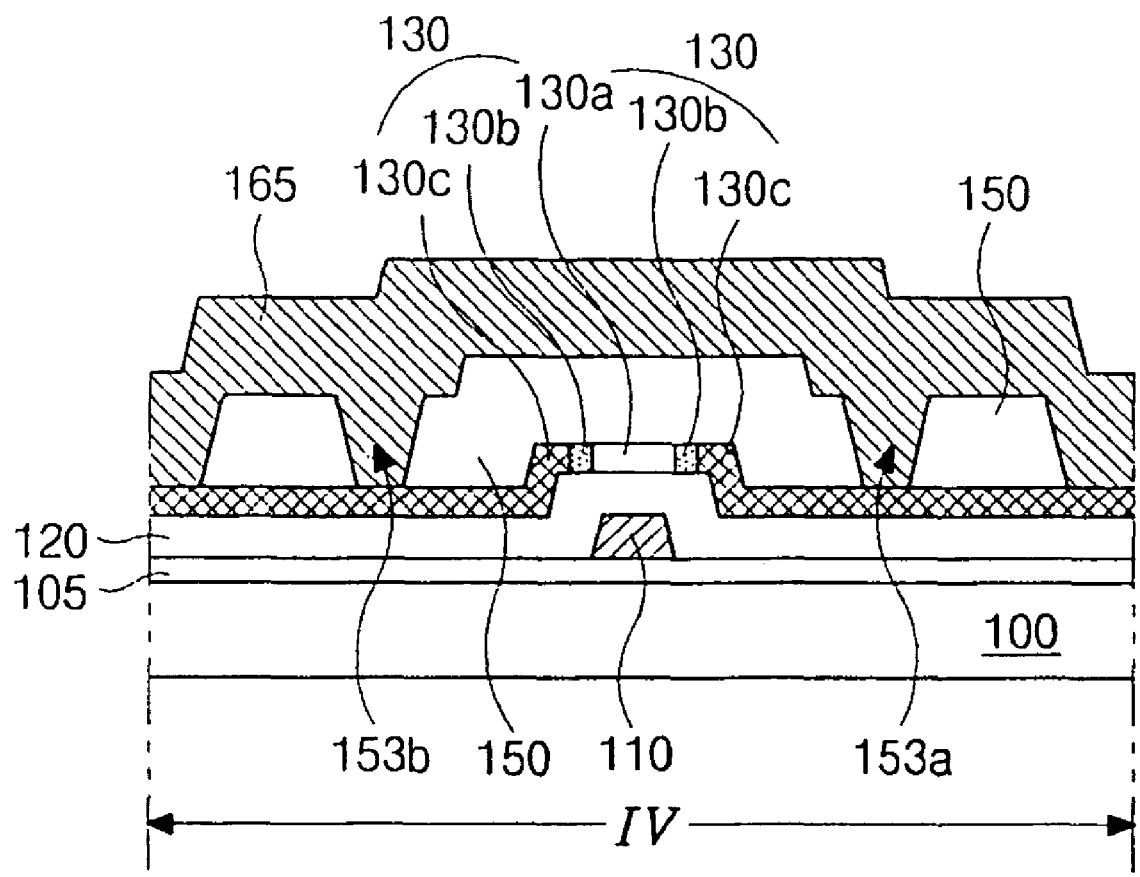
Figure 7G:
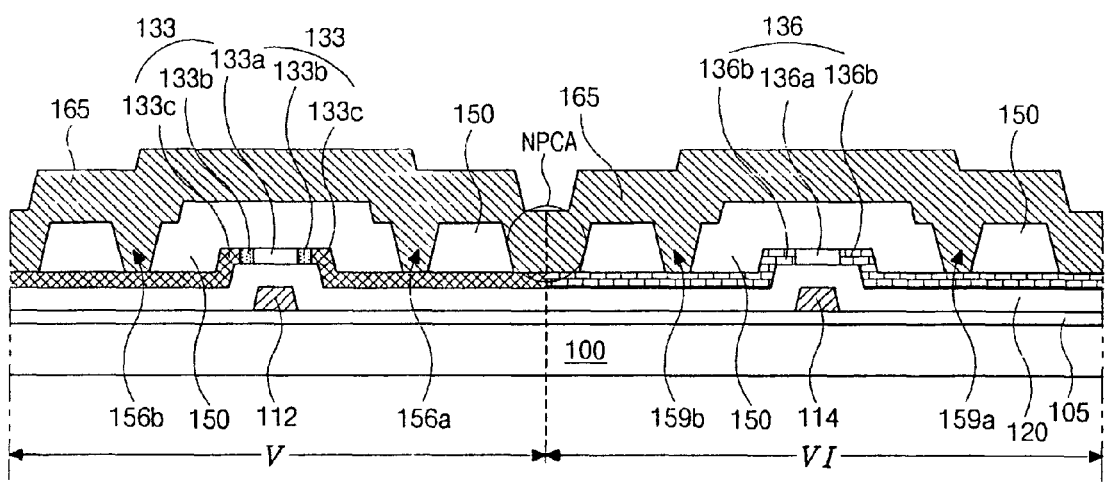

In FIGS. 6G and 7G, a metal layer 165 is formed on the interlayer insulating layer 150 by depositing a metallic material, such as aluminum (Al) or aluminum (Al) alloy.

Figure 6H:
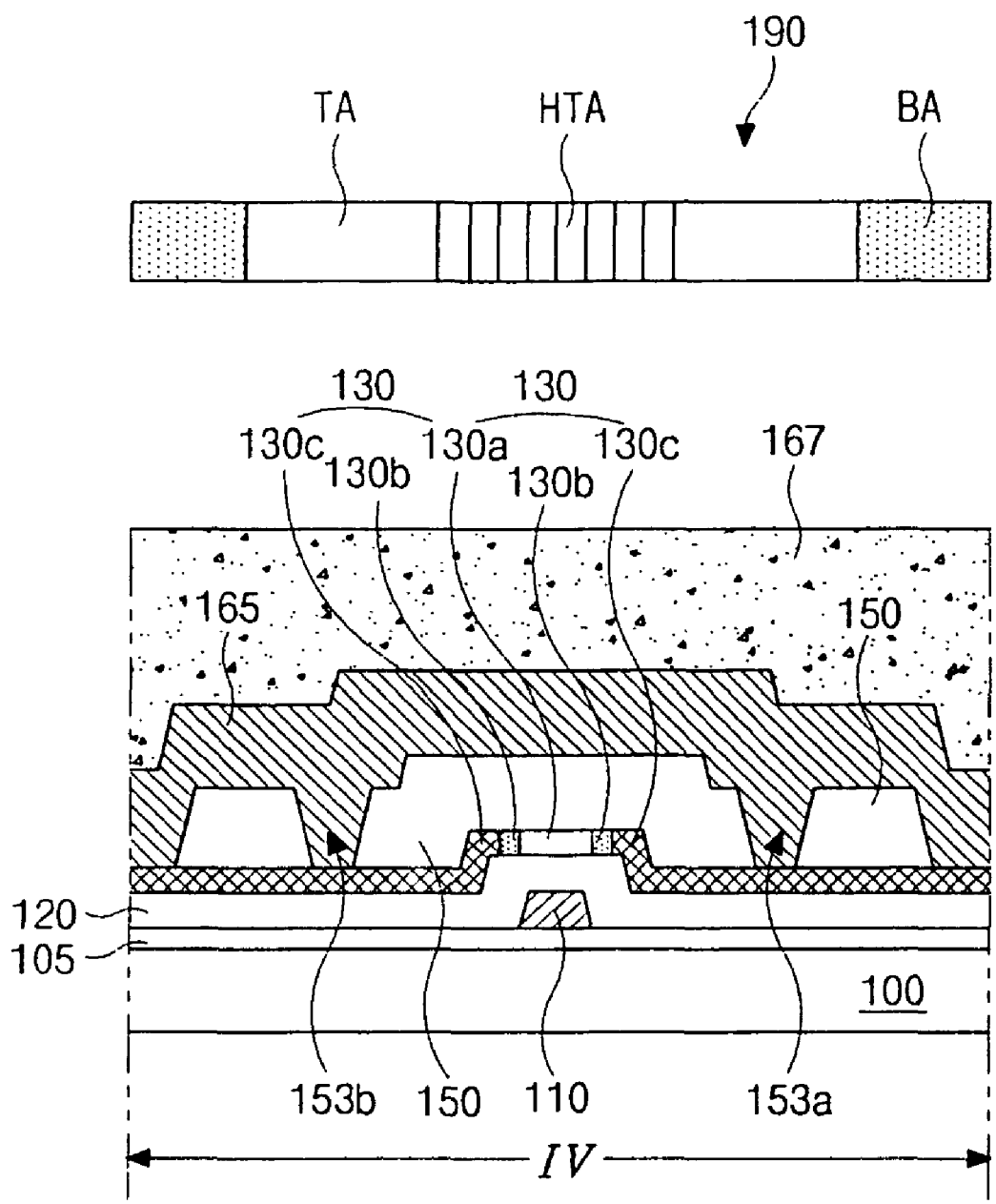
Figure 7H:
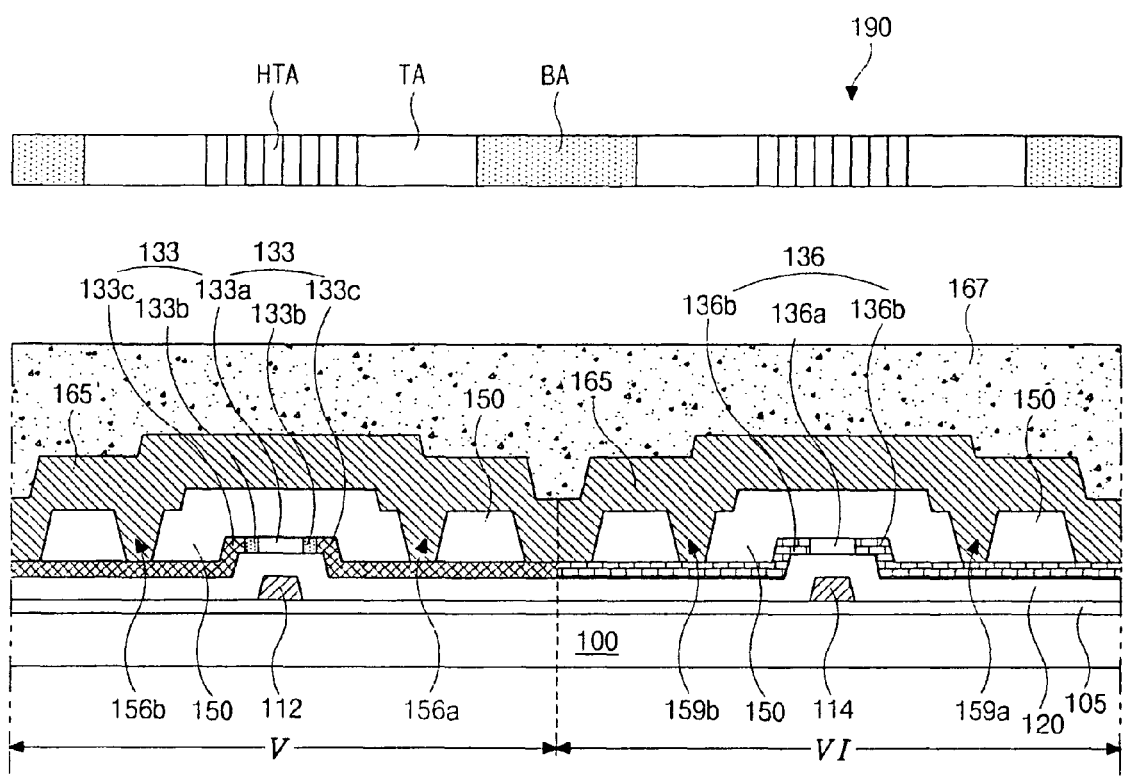

In FIGS. 6H and 7H, a photoresist (PR) layer 167 is formed on the metal layer 165 and a photo mask 190 having a transmissive area "TA," a blocking area "BA" and a half-transmissive area "HTA" is disposed over the PR layer 167. The PR layer may have a negative type or a positive type. When the PR layer having a negative type is used, an irradiated portion remains and a non-irradiated portion is removed in a developing solution. For a positive type, contrarily, an irradiated portion is removed by a developing solution and a non-irradiated portion remains even after a developing step. After the photo mask 190 is disposed, a light is irradiated onto the PR layer 167 through the photo mask 190. A transmittance of the half-transmissive area "HTA" is higher than that of the blocking area "BA" and is lower than that of the transmissive area "TA." For example, the half-transmissive area "HTA" may have a half-tone or a slit. A half-tone has a medium transmittance and light passing through a slit has a medium intensity by diffraction.

Figure 6I:
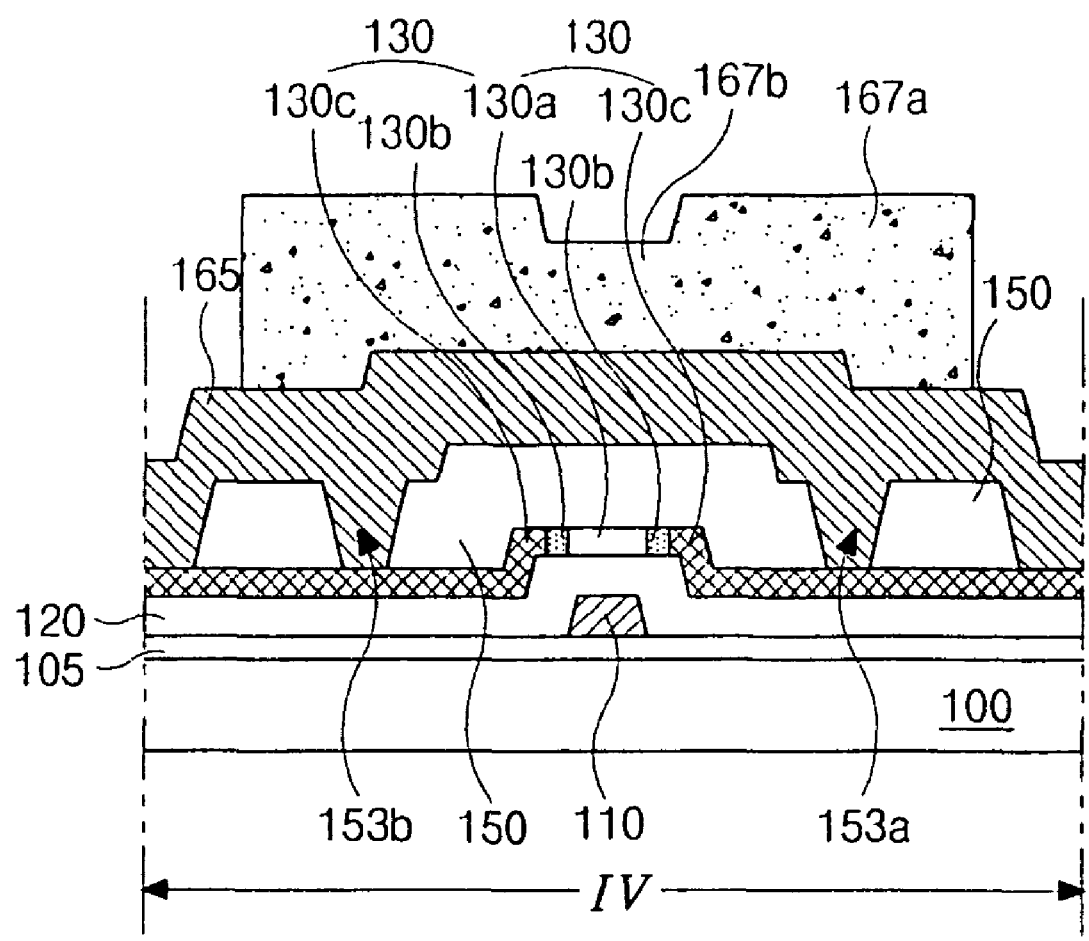
Figure 7I:
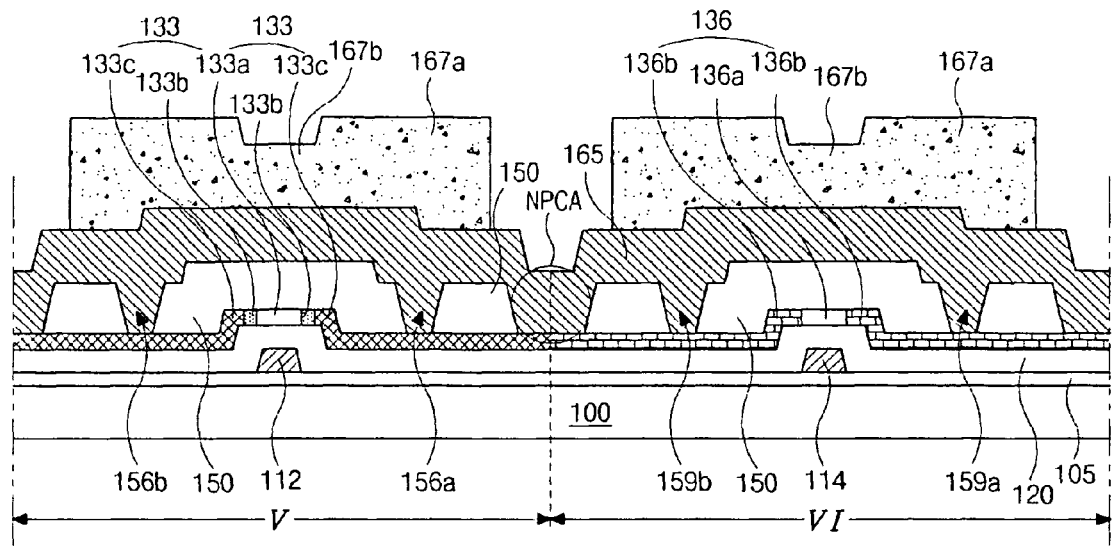

In FIGS. 6I and 7I, after light is irradiated, the PR layer 165 is developed. When the PR layer 165 has a negative type, a non-irradiated portion corresponding to the blocking area "BA" is removed. Moreover, an irradiated portion corresponding to the transmissive area "TA" and a half-irradiated portion corresponding to the half-transmissive area "HTA" remain. Accordingly, a first PR pattern 167a and a second PR pattern 167b corresponding to the transmissive area "TA" and the half-transmissive area "HTA," respectively, are obtained. The first PR pattern 167a has a first thickness and the second PR pattern 167b has a second thickness smaller than the first thickness. The first PR pattern 167a covers a portion of the metal layer 165 for source and drain electrodes of each element, and the second PR pattern 167b covers another portion of the metal layer 165 corresponding to each gate electrode 110, 112 and 114. The other portions of the metal layer 165 are exposed.

Figure 6J:
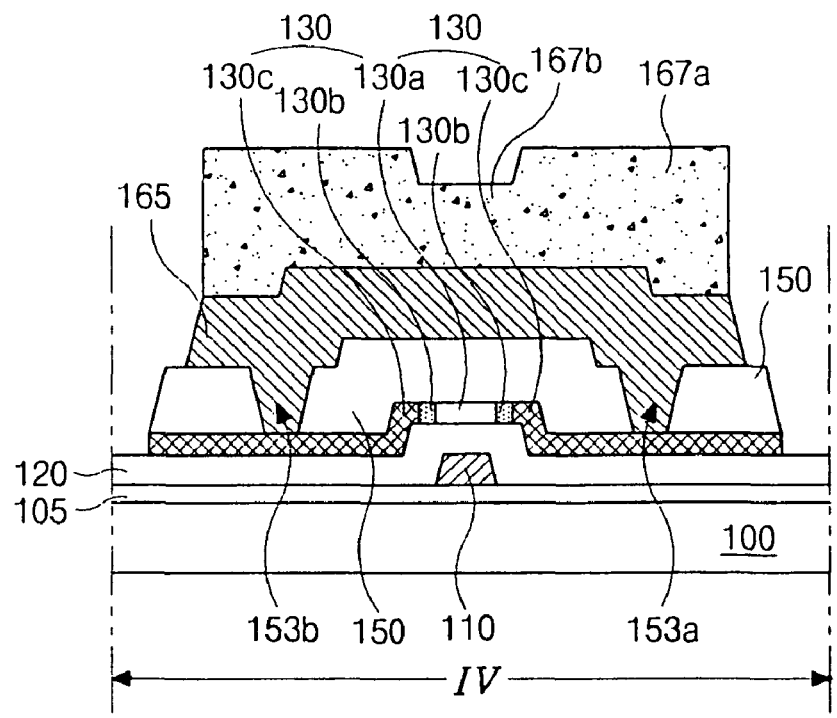
Figure 7J:
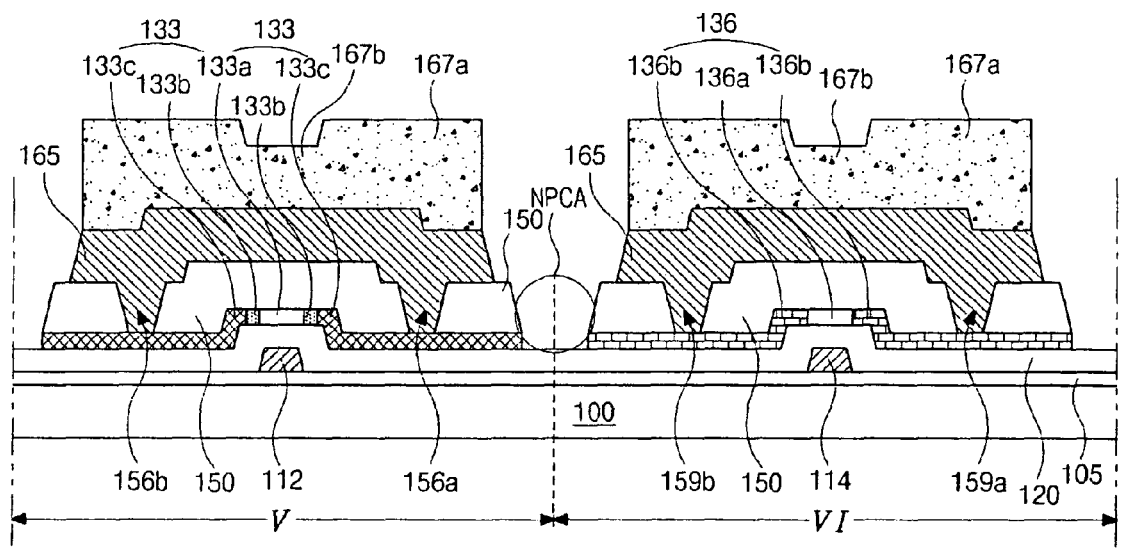

In FIGS. 6J and 7J, the metal layer 165 and each semiconductor layer 130, 133 and 136 are sequentially etched using the first and second PR patterns 167a and 167b as an etch mask. For example, the metal layer 165 may be removed through a wet etching method using an etchant and the first to third semiconductor layers 130, 133 and 136 may be removed through a dry etching method using plasma. The first, second and third semiconductor layers 130, 133 and 136 are divided into isolated patterns such that the ends of the first, second and third semiconductor layers 130, 133 and 136 coincide with the ends of each of the interlayer insulating layers 150 that correspond to each of the semiconductor layers.

Figure 6K:
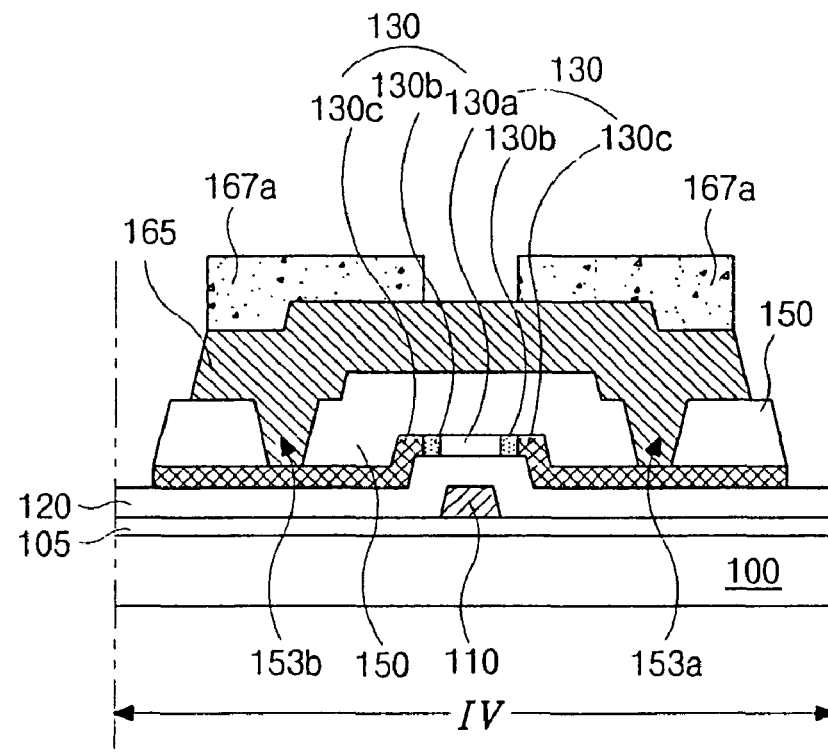
Figure 7K:
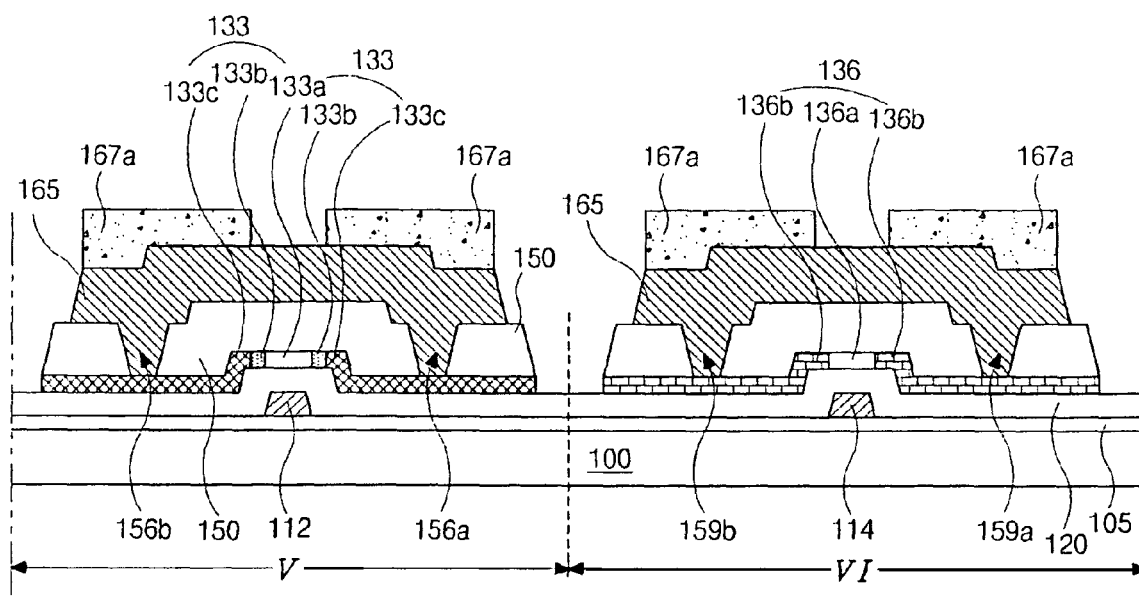

In FIGS. 6K and 7K, the first and second PR patterns 167a and 167b are equally lowered through an ashing process. During the ashing process, ashing gases anisotropically react to the first and second PR patterns 167a and 167b. Accordingly, the second PR pattern 167b is removed to expose a portion of the metal layer 165 corresponding to the second PR pattern 167b, and the first PR pattern 167a having a third thickness smaller than the first thickness remains. For example, the difference between the first thickness and the third thickness may be substantially the same as the second thickness.

Figure 6L:
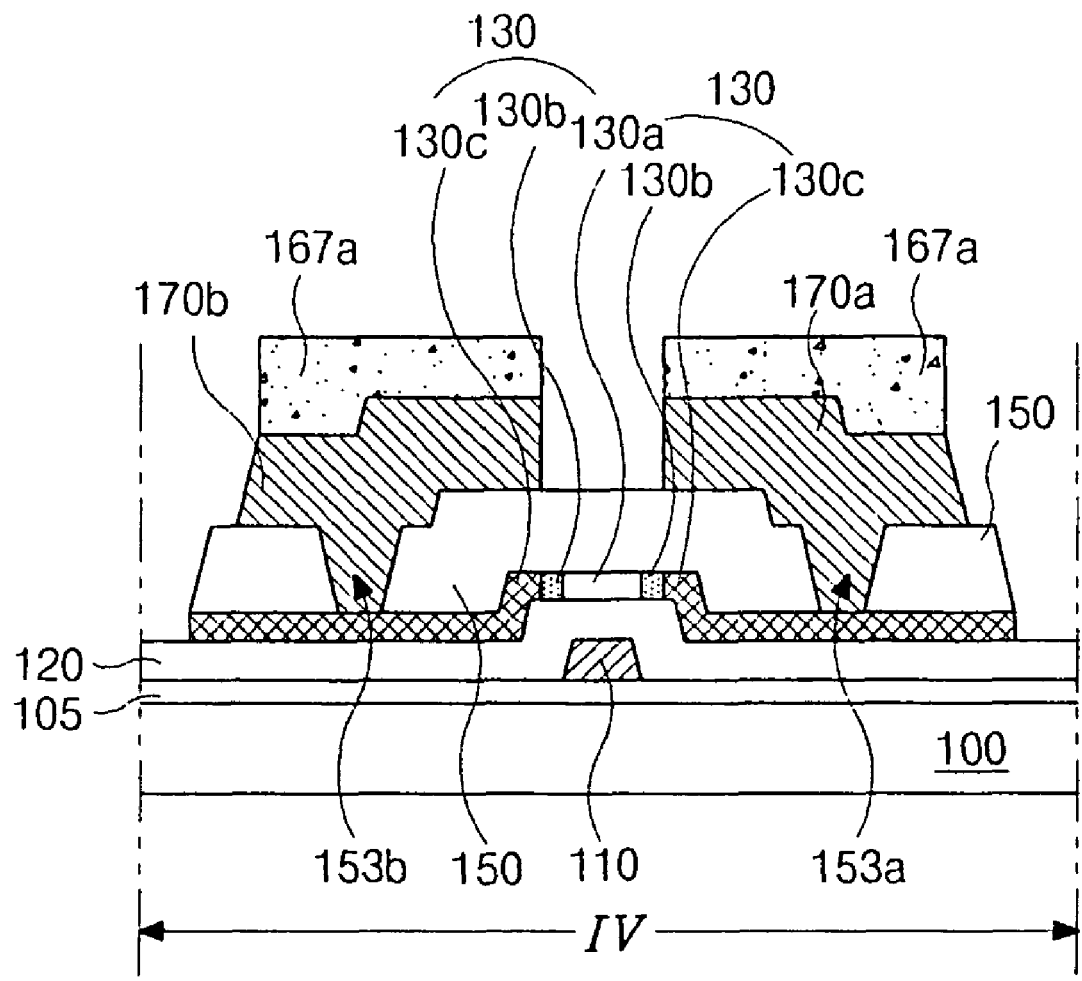
Figure 7L:
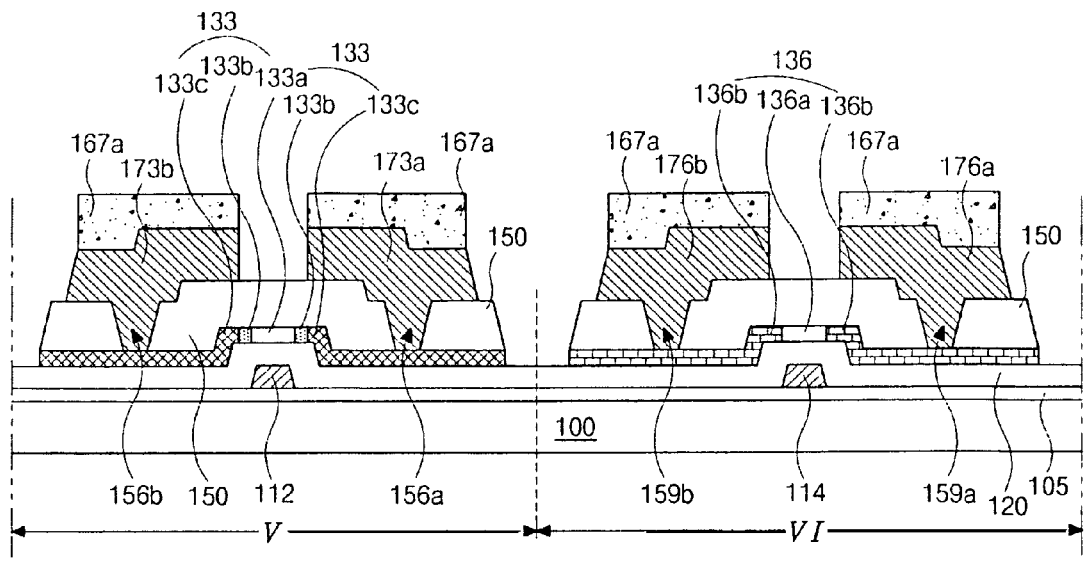

In FIGS. 6L and 7L, the metal layer 165 is etched using the first PR pattern 167a having the third thickness as an etch mask to form first source and drain electrodes 170a and 170b, second source and drain electrodes 173a and 173b, and third source and drain electrodes 176a and 176b. Accordingly, the interlayer insulating layer 150 is exposed between the source and drain electrodes.

Figure 6M:
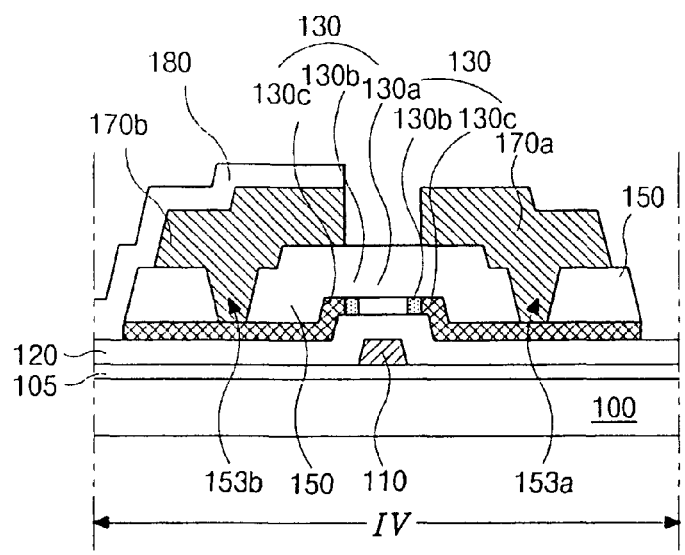
Figure 7M:
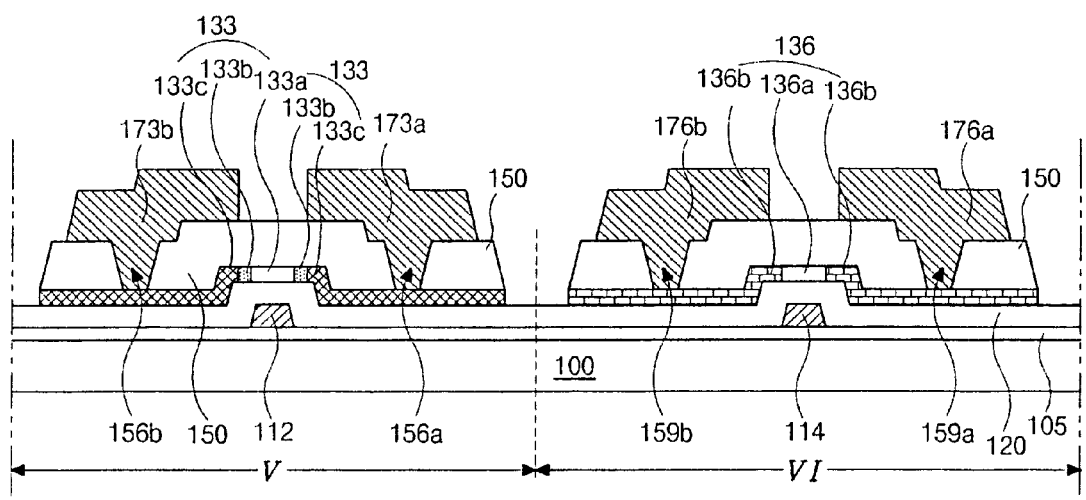

In FIGS. 6M and 7M, the first PR pattern 167a having the third thickness is removed by ashing or striping. After depositing a transparent conductive material such as indium-tin-oxide (ITO) and indium-zinc-oxide (IZO) on an entire surface of the substrate 100, a pixel electrode 180 is formed on the first drain electrode 170b through a sixth mask process. Even though not shown in FIG. 6M, the pixel electrode 180 is disposed in a pixel region defined by a gate line and a data line. Therefore, an array substrate for an LCD device of the present invention is obtained through a six-mask process.

In the previous embodiment of the present invention, doping steps for impurities are performed before forming the interlayer insulating layer. Accordingly, the semiconductor layer is exposed to the impurities for a relatively long time period. In addition, steps for forming doping masks of photoresist are repeatedly performed. As a result, the semiconductor layer, specifically a channel region, may be chemically and mechanically deteriorated by the impurities and/or the photoresist.

To solve these problems, the doping steps for impurities may be performed after forming the interlayer insulating layer in another embodiment. A buffer layer is formed on a substrate and a gate electrode is formed on the buffer layer through a first mask process. Then, a gate insulating layer and a semiconductor layer of polycrystalline silicon are sequentially formed on the gate electrode. Then, an interlayer insulating layer is formed on the semiconductor layer. After forming the interlayer insulating layer, the semiconductor layer is sequentially doped with high concentration p-type impurities (p+), high concentration n-type impurities (n+) and low concentration n-type impurities (n−) through second and third mask processes. The impurities may penetrate the interlayer insulating layer and stop in the semiconductor layer by adjusting an acceleration energy of the impurities. Since the semiconductor layer is not exposed, the deterioration of the semiconductor layer due to the impurities and the photoresist is reduced. Then, a semiconductor contact hole is formed in the interlayer insulating layer through a fourth mask process. Then the semiconductor layer is patterned and source and drain electrodes are formed on the interlayer insulating layer through a fifth mask process. Then, a pixel electrode is formed on the drain electrode in a pixel portion through a sixth mask process.

A liquid crystal display device according to the present invention includes bottom gate type thin film transistors in a pixel portion and a driving portion and is formed through a six-mask process. Accordingly, a fabrication process is simplified and a fabrication time is reduced, which reduce production cost. In addition, deterioration of a channel region in a semiconductor layer is prevented by forming an interlayer insulating layer on the semiconductor layer.

It will be apparent to those skilled in the art that various modifications and variation can be made in an LCD device of the present invention without departing from the spirit or scope of the invention. Thus, it is intended that the present invention cover the modifications and variations of this invention provided they come within the scope of the appended claims and their equivalents.

What is claimed is:

1. A method of fabricating an array substrate for a liquid crystal display device, comprising:
   providing a substrate having a pixel portion and a driving portion;
   forming a first gate electrode on the substrate in the pixel portion, and a second gate electrode and a third gate electrode on the substrate in the driving portion;
   forming a gate insulating layer on the first, second and third gate electrodes;
   forming a polycrystalline silicon layer on the gate insulating layer;
   doping a first portion of the polycrystalline silicon layer in the driving portion with p-type impurities;
   doping a second portion of the polycrystalline silicon layer in the driving portion and a third portion of the polycrystalline silicon layer in the pixel portion with n-type impurities;
   forming an interlayer insulating layer having contact holes exposing the first, second and third portions of the polycrystalline silicon layer;
   forming a metal layer on the interlayer insulating layer, the metal layer contacting the first, second and third portions of the polycrystalline silicon layer through the semiconductor contact holes;
   forming a first photoresist pattern having a first thickness and second photoresist pattern having a second thickness on the metal layer, the first thickness being greater than the second thickness;
   sequentially etching the metal layer and the polycrystalline silicon layer using the first and second photoresist patterns as an etch mask to form a first semiconductor layer in the pixel portion, and second and third semiconductor layers in the driving portion;

partially removing the first and second photoresist patterns such that the first photoresist pattern has a third thickness smaller than the first thickness;

etching the metal layer using the first photoresist pattern having the third thickness to form first source and drain electrodes in the pixel portion, and second and third source and drain electrodes in the driving portion; and forming a pixel electrode contacting the first drain electrode.

2. The method of claim 1, wherein the doping of the first portion and doping of the second portion are performed before the forming of the interlayer insulating layer.

3. The method of claim 1, wherein the doping of the first portion and the doping of the second portion are performed after the forming of the interlayer insulating layer.

4. The method of claim 1, wherein forming the first and second photoresist patterns comprises:
    forming a photoresist layer on the metal layer;
    disposing a photo mask having a transmissive area, a blocking area and a half-transmissive area over the photoresist layer;
    irradiating a light onto the photoresist layer through the photo mask; and
    developing the photoresist layer.

5. The method of claim 4, wherein the half-transmissive area has a transmittance higher than the blocking area and is lower than the transmissive area.

6. The method of claim 4, wherein the half-transmissive area includes one of a half-tone and a slit.

7. The method of claim 1, wherein the second thickness is substantially the same as a difference between the first thickness and the third thickness.

8. The method of claim 1, wherein the doping of the first portion includes:
    forming first, second and third p+ PR patterns on the polycrystalline silicon layer, the first p+ PR pattern completely covering the first semiconductor layer in the pixel portion, the second p+ PR pattern completely covering the second semiconductor layer in the driving portion, the third p+ PR pattern covering a portion of the third semiconductor layer corresponding to the third gate electrode;
    doping the first, second and third semiconductor layers with p-type impurities having a first concentration using the first, second and third p+ PR patterns as a doping mask; and
    removing the first, second and third p+ PR patterns.

9. The method of claim 8, wherein the first concentration is within a range of about $1\times10^{15}$ cm-2 to about $6\times10^{16}$ cm-2.

10. The method of claim 1, wherein the doping of the second portion includes:
    forming first, second and third n+ PR patterns on the polycrystalline silicon layer, the first n+ PR pattern covering a portion of the first semiconductor layer corresponding to the first gate electrode, the second n+ PR pattern covering a portion of the second semiconductor layer corresponding to the second gate electrode, the third n+ PR pattern completely covering the third semiconductor layer in the driving portion;
    doping the first, second and third semiconductor layers with n-type impurities having a second concentration using the first, second and third n+ PR patterns as a doping mask;
    partially removing the first, second and third n+ PR patterns to form first, second and third n− PR patterns, respectively, a width of the second n− PR pattern smaller than a width of the second n+ PR pattern;
    doping the first, second and third semiconductor layers with n-type impurities having a third concentration lower than the second concentration using the first, second and third n− PR patterns as a doping mask; and
    removing the first, second and third n− PR patterns.

11. The method of claim 10, wherein the second concentration is within a range of about $1\times10^{15}$ cm-2 to about $9\times10^{16}$ cm-2 and the third concentration is within a range of about $1\times10^{13}$ cm-2 to about $1\times10^{14}$ cm-2.

12. The method of claim 1, further comprising a buffer layer between the substrate and each of the first, second and third gate electrodes.

13. The method of claim 1, further comprising activating the p-type and n-type impurities.

14. The method of claim 1, wherein the interlayer insulating layer includes one of silicon nitride (SiNx) and silicon oxide (SiO2).

15. A method of fabricating an array substrate for a liquid crystal display device, comprising:
    providing a substrate having a pixel portion and a driving portion;
    forming a first gate electrode on the substrate in the pixel portion, and a second gate electrode and a third gate electrode on the substrate in the driving portion through a first mask process;
    sequentially forming a gate insulating layer and a polycrystalline silicon layer on an entire surface of the substrate having the first, second and third gate electrodes thereon;
    doping a first portion of the polycrystalline silicon layer in the driving portion with p-type impurities through a second mask process;
    doping a second portion of the polycrystalline silicon layer in the driving portion and a third portion of the polycrystalline silicon layer in the pixel portion with n-type impurities through a third mask process;
    forming an interlayer insulating layer having semiconductor contact holes on the polycrystalline silicon layer through a fourth mask process, the semiconductor contact holes exposing the first, second and third portions of the polycrystalline silicon layer;
    forming a metal layer on an entire surface of the substrate having the interlayer insulating layer thereon, the metal layer contacting the first, second and third portions of the polycrystalline silicon layer through the semiconductor contact holes;
    forming a first photoresist pattern having a first thickness and second photoresist pattern having a second thickness on the metal layer through a fifth mask process, the first thickness being greater than the second thickness;
    sequentially etching the metal layer and the polycrystalline silicon layer using the first and second photoresist patterns as an etch mask to form a first semiconductor layer in the pixel portion, and second and third semiconductor layers in the driving portion;
    partially removing the first and second photoresist patterns such that the first photoresist pattern has a third thickness smaller than the first thickness;
    etching the metal layer using the first photoresist pattern having the third thickness to form first source and drain electrodes in the pixel portion, and second and third source and drain electrodes in the driving portion; and
    forming a pixel electrode contacting the first drain electrode through a sixth mask process.

* * * * *